United States Patent
Tsai et al.

(10) Patent No.: US 10,477,585 B1
(45) Date of Patent: Nov. 12, 2019

(54) MICROWAVE INTERFERENCE MITIGATION

(71) Applicant: Amazon Technologies, Inc., Seattle, WA (US)

(72) Inventors: Kun Ting Tsai, Fremont, CA (US); Chirag Bhavsar, Santa Clara, CA (US); Huanchun Ye, Cupertino, CA (US); Varadarajan Gopalakrishnan, Cupertino, CA (US); QingYun Wei, San Jose, CA (US); Morris Hsu, Mountain View, CA (US); James Edwin Christy, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/049,593

(22) Filed: Jul. 30, 2018

(51) Int. Cl.
*H04W 74/08* (2009.01)
*H04B 15/02* (2006.01)
*G06F 3/16* (2006.01)

(52) U.S. Cl.
CPC ........ *H04W 74/0816* (2013.01); *G06F 3/167* (2013.01); *H04B 15/02* (2013.01)

(58) Field of Classification Search
CPC ......... G06F 3/167; H04B 15/02; H05B 6/668; H05B 6/664; H05B 6/686; Y02B 40/14; Y02B 40/143
See application file for complete search history.

(56) References Cited

U.S. PATENT DOCUMENTS

| | | | | |
|---|---|---|---|---|
| 6,166,363 | A * | 12/2000 | Shon | H05B 6/687 219/703 |
| 6,396,035 | B2 * | 5/2002 | Shon | H05B 6/6435 219/702 |
| 8,050,627 | B2 * | 11/2011 | Makhlouf | H04W 74/0808 455/63.1 |
| 9,549,332 | B2 * | 1/2017 | Ponnuswamy | H04L 41/22 |
| 2017/0215237 | A1 * | 7/2017 | Hirano | H05B 6/80 |

* cited by examiner

*Primary Examiner* — Ahmed Elallam
(74) *Attorney, Agent, or Firm* — Lee & Hayes, P.C.

(57) ABSTRACT

Microwave interference mitigation techniques and systems are disclosed herein. In some embodiments, microwave interference mitigation involves coordinating wireless traffic in accordance with a magnetron's on-and-off cycle so that data is not sent during the magnetron's on period, and is exclusively sent during the magnetron's off period. Wireless traffic can be coordinated using a voltage monitoring and zero-crossing point detection technique coupled with a Clear To Send (CTS) packet. For non-microwave devices, wireless traffic coordination can be achieved using a pattern matching algorithm coupled with a Clear Channel Assessment (CCA) threshold adjustment during the magnetron's on-and-off cycles. Additional, or alternative, microwave interference mitigation techniques involve decreasing a maximum packet size for data packets that are to be transmitted wirelessly in the environment, which guarantees successful transmission of data packets during the magnetron's off periods.

20 Claims, 9 Drawing Sheets

US 10,477,585 B1

MICROWAVE INTERFERENCE MITIGATION

BACKGROUND

The industrial, scientific and medical (ISM) radio bands were originally reserved for industrial, scientific and medical purposes other than telecommunications, such as microwave ovens, which operate in the 2.4 gigahertz (GHz) radio band. Over time, as congestion of the radio spectrum has increased and communication technology has evolved, these ISM bands have been appropriated for wireless data communication, such as wireless fidelity (WiFi) communication. In fact, an entire industry has been created around consumer-grade WiFi devices, which use the same 2.4 GHz band used by microwave ovens to wirelessly transmit data over wireless local area networks (WLANs). For example, hands-free, speech interface devices that use voice assistant technology to access various cloud-based services (e.g., music streaming services, smart home control services, etc.) use the 2.4 GHz band for wireless data communication.

The coexistence of wireless communication devices and microwave ovens on the same 2.4 GHz radio band creates a problem in the common household where a microwave oven is often a staple of the kitchen. Specifically, whenever the microwave oven is running (e.g., cooking food), the energy emissions from the microwave oven create electromagnetic interference, which disrupts radio communication of nearby wireless communication devices that use the same frequency band to wirelessly transmit data, causing data transfer failures due to dropped packets. Today, microwave interference is tolerated, and, as a result, wireless communication devices do not function properly in the presence of microwave interference.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
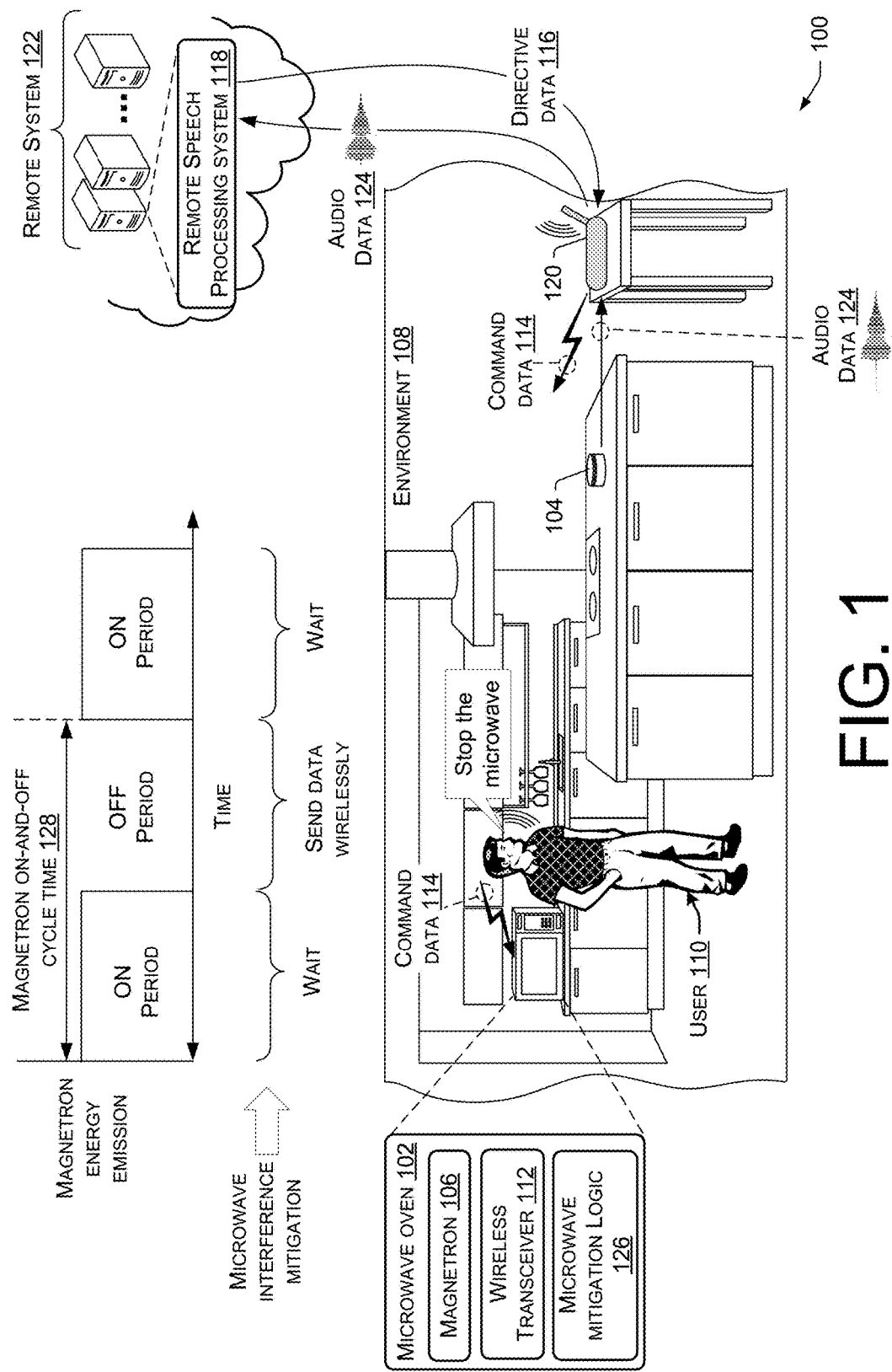
FIG. 1 illustrates an example system including, inter alia, a microwave oven and a speech interface device, as well as an example technique for mitigating microwave interference that involves coordinating wireless traffic in accordance with the on-and-off cycle of the microwave oven's magnetron.

Described herein are, among other things, techniques, devices, and systems for mitigating microwave interference. A microwave oven may reside within an environment (e.g., in a home, office, hotel, etc.), perhaps along with one or more additional wireless communication devices (including, for example, one or more speech interface devices, home automation devices, mobile phones, tablets, TVs, wireless speakers, etc.). The microwave oven itself may be a wireless communication device that is equipped with a wireless transceiver to transmit data wirelessly within the environment. In this scenario, the microwave oven can employ the microwave interference mitigation techniques described herein. Additionally, or alternatively, the microwave interference mitigation techniques described herein can be employed by a non-microwave wireless communication device (e.g., a speech interface device) that is collocated in the environment with a microwave oven.

A user can operate a microwave oven by starting and stopping the microwave oven. When the microwave oven is started, a magnetron operates by generating microwave energy that heats food within the microwave oven to a higher temperature. While the microwave oven is not running (and hence, the magnetron is not operating), a wireless communication device(s) (e.g., the microwave oven itself, a speech interface device, a mobile phone, etc.) in the environment may transmit data wirelessly without any impact on the performance of the wireless data transmission from the microwave oven. However, as mentioned above, whenever the microwave oven is running (e.g., cooking food), the energy emissions generated by the magnetron of the microwave oven create electromagnetic interference, which disrupts radio communication in the environment of the microwave oven in the absence of the techniques and systems described herein.

The techniques and systems described herein mitigate this microwave interference in various ways. In some embodiments, a microwave interference mitigation technique involves coordinating wireless traffic in accordance with the magnetron's on-and-off cycle. For instance, a wireless communication device (e.g., the microwave oven itself, a speech interface device in the environment of the microwave oven, etc.) may determine if the magnetron of the microwave oven is operating, and, if the magnetron is operating, a coordination mechanism can be implemented to send data wirelessly in the environment during the magnetron's off period, and to cease sending the data in the environment during the magnetron's on period. Such a coordination mechanism can be implemented in various ways.

One example way of implementing the coordination mechanism is through a voltage monitoring technique where a microcontroller of the microwave oven determines that the magnetron is operating by determining that a voltage supplied to the magnetron "dips" below a threshold voltage, and logic of the microwave oven responds by sending a Clear To Send (CTS) packet before the start time of the magnetron's on period to coordinate wireless traffic in accordance with the on-and-off cycle of the magnetron. When using this technique, the start time of the magnetron's on period can be determined as a time corresponding to a zero-crossing point between an input power associated with the magnetron and an electrical current associated with the magnetron. The CTS packet effectively "silences" the network for a duration that is specified in a Network Allocation Vector (NAV) of the CTS packet. This duration can be set to a value that corresponds to the magnetron's on period, where the magnetron's on period can be derived from an input power frequency of the magnetron. For instance, if the input power frequency of the magnetron is 60 Hz, the magnetron's on-and-off cycle time can be calculated as roughly 16 milliseconds (ms). At a 50% duty cycle, the magnetron's on period is roughly 8 ms. In this scenario the NAV of the CTS packet can be set to a value that is slightly more than 8 ms to cover the magnetron's on period plus the time between sending the CTS packet and the start time of the on period. The wireless communication devices that receive the CTS packet will wait the duration specified in the NAV of the CTS packet before sending data wirelessly in the environment. Furthermore, the wireless communication device that sends the CTS packet also waits for the magnetron's on period to lapse before sending data wirelessly in the environment during the magnetron's off period. This technique can iterate for subsequent on-and-off cycles of the magnetron so that the wireless transmission of data is coordinated (e.g., data is exclusively sent wirelessly during the magnetron's off periods while the magnetron is operating), thereby mitigating microwave interference.

Another example way of implementing the coordination mechanism is through a non-microwave wireless communication device's ability to detect non-WiFi energy using a wireless transceiver (e.g., a WiFi chip) and to adjust a Clear Channel Assessment (CCA) threshold in accordance with the on-and-off cycle of the magnetron. For example, a wireless transceiver (e.g., a WiFi chip) of the wireless communication device may be used to determine the presence of energy waveforms in the environment, and a pattern matching algorithm can be used to compare the detected energy waveform to a repository of microwave energy waveform patterns. If the detected energy waveform matches a pattern associated with microwave energy, this indicates to the non-microwave wireless communication device that a magnetron in the environment is operating. The detected energy waveform can be analyzed to determine a start time of the magnetron's on period, and a start time of the magnetron's off period, and the wireless communication device may use this timing information to dynamically adjust the CCA threshold in accordance with the on-and-off cycle of the magnetron, such as by increasing the CCA threshold at the start time of the magnetron's on period, and by decreasing the CCA threshold at the start time of the magnetron's off period. The wireless communication device may refrain from sending data wirelessly during the magnetron's on periods because the microwave energy generated by the magnetron is likely to exceed the relatively high CCA threshold during the magnetron's on period, yet the device may send data wirelessly during the magnetron's off periods when it is free from microwave interference. The lower CCA threshold during the magnetron's off period may also allow the wireless communication device to receive low RSSI signals.

In some embodiments, a microwave interference mitigation technique involves decreasing a maximum packet size for data packets that are to be transmitted wirelessly in the environment to a sufficiently low value that guarantees successful transmission of data packets during the magnetron's off periods. For example, a standard maximum packet size for wireless data packets may be 1500 bytes, which is suitable for scenarios when the microwave oven is not running. However, in scenarios when the microwave oven is emitting microwave energy, if wireless communication devices attempt to transmit 1500 byte packets, the interference from the microwave energy will cause these packets to drop during the magnetron's on period, and over the course of multiple dropped packets, the sending devices will dynamically lower their data rates due to a rate fallback mechanism. By the time the magnetron's off period starts, the sending device's data rate may have been decreased to a very low ratee (e.g., 1 megabit-per-second (Mbps)), and a 1500 byte packet is too large to send during the magnetron's off period at this low data rate. Accordingly, a wireless communication device, such as the microwave oven, can set a maximum packet size to a smaller-than-normal size (e.g., 250 bytes) using the Transmission Control Protocol (TCP) Maximum Segment Size (MSS) during setup of a TCP session with a remote system.

In some embodiments, this packet size reduction technique can be implemented with, or without, the coordination mechanisms described herein. That is, a "brute force" packet size reduction technique is one example way of mitigating microwave interference by ensuring that the smaller size packets can be sent successfully during the magnetron's off period, even when the data rate between the wireless communication device and the access point (AP) is scaled down to a very low data rate, such as 1 Mbps. In some embodiments, the packet size reduction approach can be used in combination with the coordination mechanisms described herein, which may provide further benefits. In some embodiments, the maximum packet size can be decreased dynamically based on the signal strength of the AP in the environment. In this manner, the size of data packets can be adjusted on an as-needed basis in accordance with changes in the signal strength of the AP to optimize throughput. For example, the wireless communication device may be configured to determine the signal strength of the AP, and may dynamically decrease the maximum allowable packet size if the signal strength decreases (e.g., below a threshold signal strength). Thus, in some embodiments, the maximum packet size may not be decreased unless and until the data rate decreases and the signal strength of the AP weakens.

The microwave interference mitigation techniques, as described herein, can provide operability of wireless communication devices whose communication ability would otherwise be inhibited in the presence of microwave interference. In an example scenario, a user may have started the microwave oven to cook food, and, while the microwave oven is running, the user may utter the phrase "Stop the microwave." In the absence of the microwave mitigation techniques described herein, the packets may be dropped and the microwave oven may not turn off despite the voice command. Not only is this an inconvenience to the user, but it can be a safety hazard (e.g., a fire hazard). Using the disclosed microwave mitigation techniques, however, a speech interface device in the presence of microwave energy can successfully send the audio data to a remote speech processing system, which responds with directive data that is ultimately received as command data by a wireless transceiver of the microwave oven to turn the microwave oven off. Thus, the microwave energy from the microwave oven does not adversely impact the wireless traffic (e.g., the audio data, the command data, etc.) when the techniques and systems described herein are employed to mitigate microwave interference. Compute resources of wireless communication devices in the environment may also be conserved through the implementation of the microwave interference mitigation techniques described herein. For example, the coordination of wireless traffic may result in fewer wasteful attempts at wireless data transmission during the magnetron's on periods. As another example, the selective, and dynamic, reduction of the maximum allowable packet size may increase throughput of wireless traffic at times when there is a sufficiently high data rate, and may refrain from reducing the packet size until it is useful to do so.

FIG. 1 illustrates an example system 100 including a microwave oven 102 and a speech interface device 104. FIG. 1 also illustrates an example technique for mitigating microwave interference that involves coordinating wireless traffic in accordance with the on-and-off cycle of the microwave oven's 102 magnetron 106. The microwave oven 102 and the speech interface device 104 may be located within an environment 108, and they may provide various capabilities to a user 110 in the environment 108. The environment 108 in which the microwave oven 102, the speech interface device 104, and the user 110 are collocated may be a home or other premises, an office building, a hotel, or any similar environment. Such an environment 108 may include other devices than those depicted in FIG. 1, including, without limitation, additional speech interface devices, and/or second devices (e.g., Internet of Things (IoT) devices and/or smart home devices like thermostats, lights, refrigerators, ovens, etc.) that may be controllable by speech interface devices, such as the speech interface device 104. In some embodiments, the microwave oven 102 may be considered a "smart home device" that is controllable by speech interface devices, such as the speech interface device 104. For example, the user 110 may issue voice commands to control the operation of the microwave oven 102 (e.g., start or stop the microwave oven 102) and/or to control other settings of the microwave oven 102 (e.g., setting a timer, adjusting the cooking time and/or temperature, etc.). Accordingly, the microwave oven 102 may, in some embodiments, include a wireless transceiver 112 (e.g., a WiFi radio chip, a Bluetooth Low Energy (BLE) radio chip, any combination thereof, etc.) to send/receive data wirelessly to/from other devices in the environment 108, and over a wide area computer network (e.g., the Internet), such as to control the microwave oven 102 using voice commands.

In some embodiments, the microwave oven 102 may even function as a speech interface device itself, and, in this case, the microwave oven 102 may be equipped with a microphone and a voice services component that assists in processing of user speech. However, it is to be appreciated that the microwave oven 102 may omit a microphone, and voice commands may be captured by a microphone(s) of other speech interface devices in the environment 108, such as the speech interface device 104. In any case, the microwave oven 102 may be controllable using voice commands, in some embodiments. It is also to be appreciated that the microwave oven 102 may, in some embodiments, represent a legacy microwave oven that omits a wireless transceiver, is not voice-controllable, and operates using traditional user input, such as by touching buttons on the microwave oven 102 itself to start and stop the microwave oven 102, enter a cook time, and the like. In this legacy microwave oven scenario, microwave interference mitigation techniques described herein can be implemented by the speech interface device 104, or any other wireless communication device in the environment 108 with similar capabilities.

In general, the speech interface device 104 may be capable of capturing utterances with a microphone(s), and responding in various ways, such as by outputting content via an output device(s) (e.g., a speaker(s), a display(s), etc.), and/or by controlling second devices in the environment 108). In some embodiments, directive data 116 received from a remote speech processing system 118 may be sent from an access point (AP) 120 (e.g., a wireless router) in the environment 108 as command data 114 directly to the microwave oven 102 without routing the command data 114 through the speech interface device 104. In some embodiments, the command data 114 sent from the AP 120 to the microwave oven 102 may be the directive data 116 itself, or the command data 114 may represent data that is generated as a result of processing the directive data 116 received from the remote speech processing system 118. In either case, the command data 114 may cause an action to be performed at the microwave oven 102 (e.g., to start or stop the microwave oven 102).

In general, the speech interface device 104 and/or the microwave oven 102 may operate in conjunction with and/or under the control of a remote, network-based or network-accessible control system 122 (abbreviated to "remote system" 122 in FIG. 1) when responding to user speech. The remote system 122 may, in some instances be part of a network-accessible computing platform that is maintained and accessible via a wide area network. Network-accessible computing platforms such as this may be referred to using terms such as "on-demand computing", "software as a service (SaaS)", "platform computing", "network-accessible platform", "cloud services", "data centers", and so forth. The remote system 122 may be configured to provide particular functionality to large numbers of local (e.g., in-home, in-car, etc.) devices of different users.

The remote speech processing system 118 (which is part of the remote system 122) may be configured to receive audio data 124 from the speech interface device 104 (and/or from the microwave oven 102), to recognize speech in the received audio data 124, and to perform functions in response to the recognized speech. In some embodiments, these functions involve sending directives (directive data 116), from the remote system 122, to devices in the environment 108 (e.g., the microwave oven 102, the speech interface device 104, etc.) via the AP 120 to cause performance of an action at the target device, such as outputting an audible response to the user speech via a speaker(s), and/or controlling the target devices in the environment 108 (e.g., to start or stop the microwave oven 102).

Among other logical and physical components, the remote speech processing system 118 may include an automatic speech recognition (ASR) component that is configured to perform ASR on the audio data 124 to convert the audio data 124 into ASR text data. ASR transcribes audio data into text data representing the words of the user speech contained in the audio data 124. A spoken utterance in the audio data can be input to the ASR component of the remote speech processing system 118, which then interprets the utterance based on the similarity between the utterance and pre-established language models available to the remote speech processing system 118. For example, the ASR component may compare the input audio data 124 with models for sounds (e.g., subword units or phonemes) and sequences of sounds to identify words that match the sequence of sounds spoken in the utterance of the audio data 124. In some embodiments, the ASR component outputs the most likely text recognized in the audio data 124, or multiple hypotheses in the form of a lattice or an N-best list with individual hypotheses corresponding to confidence scores or other scores (such as probability scores, etc.).

The remote speech processing system 118 may also include a natural language understanding (NLU) component that performs NLU on the generated ASR text data to determine an intent so that directives may be determined based on the intent. Generally, the NLU component takes textual input (such as processed from the ASR component) and attempts to make a semantic interpretation of the ASR text data. That is, the NLU component determines the meaning behind the ASR text data based on the individual words, and then the NLU component can implement that meaning. The NLU component interprets a text string to derive an intent or a desired action or operation from the user 110. This may include deriving pertinent pieces of information in the text that allow the NLU component to identify a target device in the environment, if the user, for example, intends to control a target device (e.g., the microwave oven 102). In the example of FIG. 1, the ASR component of the remote speech processing system 118 may output the ASR text "Stop the microwave," and the NLU component of the remote speech processing system 118 may determine that the user 110 intended to control the microwave oven 102 by stopping the microwave oven 102. The remote speech processing system 118 may also include, or be configured to use, one or more speechlets that represent domains that are used in order to determine how to act on an utterance in a particular way, such as by outputting a directive (e.g., directive data 116) that corresponds to the determined intent, and which can be processed to implement the desired operation. For example, a device control speechlet (or device control domain) may act on utterances with intents to control a target device(s) in the environment 108, such as the microwave oven 102. In an example, directive data 116 that is generated by a domain/speechlet of the remote speech processing system 118 may be formatted using Java, such as JavaScript syntax, or JavaScript-based syntax. This may include formatting the directive using JSON.

When the microwave oven 102 is not running, the magnetron 106 is not operating, and data can be transmitted wirelessly in the environment 108, in real time, and at any suitable data packet size, without microwave interference. For example, the directive data 116 may be received at the AP 120 in packets that are 1500 bytes in size. The maximum packet size of 1500 bytes may be negotiated when setting up a TCP session between the remote system 122 and any of the wireless communication devices in the environment 108, such as the microwave oven 102. Thereafter, data can be sent between wireless communication devices wirelessly in packets that are 1500 bytes. For example, the AP 120—a wireless communication device—may send/receive 1500 byte packets to/from the speech interface device 104 and/or the microwave oven 102, among other wireless communication devices that may coexist in the environment 108.

Whenever the user 110 starts the microwave oven 102 (e.g., to cook food), the magnetron 106 begins to operate by generating microwave energy. To mitigate the interference of this microwave energy with wireless data communications in the environment 108, the microwave oven 102 may be equipped with microwave mitigation logic 126 (e.g., software, hardware, and/or firmware, etc., and sometimes referred to as "logic 126"). The logic 126 may be configured to mitigate microwave interference in various ways. An example technique that implements a coordination mechanism to coordinate wireless traffic in the environment 108 is shown in FIG. 1. It is to be appreciated that the magnetron 106 operates in accordance with an on-and-off cycle where the magnetron 106 is actively emitting microwave energy during an "on period" of the cycle, and the magnetron 106 is not emitting microwave energy during an "off period" of the cycle. The magnetron's 106 on-and-off cycle time 128 is dictated by the input power frequency of the microwave oven 102, which can vary among different makes and models of microwaves. A common type of microwave oven 102 operates at an input (alternating current) power frequency of 60 Hz, which means that the on-and-off cycle time 128 of the magnetron 106 is roughly 16 ms in duration. At a 50% duty cycle, this means that the duration of each on period of the magnetron's 106 on-and-off cycle is roughly 8 ms, and the duration of each off period is also roughly 8 ms. By contrast, for a microwave oven 102 with an input power frequency of 50 Hz, the on-and-off cycle time 128 of the magnetron 106 is 20 ms in duration. At a 50% duty cycle, this means that the duration of the magnetron's 106 on period is 10 ms in duration.

In any case, the logic 126 of the microwave oven 102 is configured to determine that the magnetron 106 is operating, and, in response, implement a coordination mechanism to (i) prevent data from being sent wirelessly in the environment 108 during the on period of the on-and-off cycle of the magnetron 106, and (ii) allow the data to be sent wirelessly in the environment 108 during the off period of the on-and-off cycle of the magnetron 106. In other words, the microwave oven 102 (and/or other wireless communication devices in the environment 108, such as the speech interface device 104) can wait (i.e., refrain from sending data wirelessly) during the on periods of the magnetron's 106 on-and-off cycle, and send data (if available and necessary) during the off periods of the magnetron's 106 on-and-off cycle. With this coordination mechanism in place, wireless data communication in the environment 108 is not impacted by the microwave energy generated by the magnetron 106. Accordingly, the wireless communication devices in the environment 108 may remain operational in the presence of microwave energy.

To illustrate how wireless traffic is coordinated in the example of FIG. 1, consider a scenario where the user 110 utters the expression "Stop the microwave," implying that the microwave oven 102 is presently running when the user 110 utters the expression "Stop the microwave." As described herein, in response to the magnetron 106 starting to operate, the microwave mitigation logic 126 will have implemented the coordination mechanism so that wireless traffic can be coordinated to mitigate the microwave interference from the microwave energy. When the user 110 speaks, the speech interface device 104 may capture the user's 110 utterance via a microphone(s) of the speech interface device 104, detect a wakeword, and thereafter wait until the start of the magnetron's 106 next off period before sending audio data 124 representing the user's speech to the AP 120. In some examples, the microwave oven 102 may have previously sent a packet (e.g., a CTS packet) that was received by the speech interface device 104 causing the speech interface device 104 to wait before sending the audio data 124, or the speech interface device 104 may implement its own coordination mechanism (e.g., pattern matching coupled with a CCA threshold adjustment) causing the speech interface device 104 to wait before sending the audio data 124. These example coordination mechanisms will be described in more detail below. In any case, at the start of the next off period of the magnetron, the audio data 124 is sent to the AP 120. Despite the magnetron's 106 emission of microwave energy, because the audio data 124 was sent during the magnetron's 106 off period (as opposed to its on period), the audio data 124 is successfully received by the AP 120 and is not dropped in transit. This audio data 124 can be sent wirelessly to the AP 120 in packets of any suitable size (e.g., 1500 byte packets), which, presuming a suitably high data rate, can comfortably fit within the magnetron's 106 off period. For example, assuming a data rate of 54 Mbps, a 1500 byte packet can be sent from the speech interface device 104 to the AP 120 in about 0.22 ms; well within the typical duration of the magnetron's 106 off period, which, as mentioned, can be 8-10 ms in duration.

The AP 120 can send the audio data 124 to the remote speech processing system 118 over a wide area network, which can be done at any time because this type of communication is typically done through a cable connection (e.g., a wired connection to a modem). It is to be appreciated that a wide area network over which data is sent/received by the AP 120 to/from the remote system 122 is representative of any type of public or private, wide-area network, such as the Internet, which extends beyond the environment 108. Thus, the wide area network over which data is sent/received by the AP 120 to/from the remote system 122 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

Upon receipt of the audio data 124, the remote speech processing system 118 performs ASR processing and NLU processing to ultimately determine an intent based on the audio data 124. This intent is used to generate directive data 116, which is sent from the remote speech processing system 118 to the speech interface device 104 (or to the microwave oven 102) via the AP 120. The AP 120, upon receiving the directive data 116, may wait until the start of the magnetron's 106 next off period before sending command data 114 (e.g., the directive data 116, or data generated based on processing the directive data 116) to a target device in the environment 108 (e.g., the microwave oven 102, the speech interface device 104, etc.). Again, the microwave oven 102 may have previously sent a packet (e.g., a CTS packet) that was received by the AP 120 causing the AP 120 to wait before sending the command data 114, or the AP 120 may implement its own coordination mechanism (e.g., pattern matching coupled with a CCA threshold adjustment) causing the AP 120 to wait before sending the command data 114 downstream. Because the command data 114 is sent from the AP 120 during the magnetron's 106 next off period, the command data 114 is successfully received by the target device (e.g., the microwave oven 102, the speech interface device 104, etc.). This command data 114 can be sent wirelessly from the AP 120 in packets of any suitable size (e.g., 1500 byte packets), which, presuming a suitably high data rate (e.g., 54 Mbps), can comfortably fit within the magnetron's 106 off period.

If the microwave oven 102 is the receiving device of the command data 114, a voice services component of the microwave oven 102 may process the command data 114 to cause the microwave oven 102 to perform an action. In the example of FIG. 1, the action performed by the microwave oven 102 is an action of stopping the operation of the microwave oven 102 (i.e., stop the operation of the magnetron 106). Again, with the coordination mechanism implemented by the microwave mitigation logic 126, the AP 120 may wait until the start of the magnetron's 106 next off period before sending the command data 114 to the microwave oven 102, and because the command data 114 is sent during the magnetron's 106 off period, the command data 114 is successfully received by the microwave oven 102. As with the other wireless data transmissions, the command data 114 can be sent wirelessly to the microwave oven 102 in packets of any suitable size (e.g., 1500 byte packets), which, presuming a suitably high data rate (e.g., 54 Mbps), can comfortably fit within the magnetron's 106 off period. Accordingly, the wireless traffic coordination technique of FIG. 1 mitigates the impact of microwave interference on wireless data communication in the environment 108, allowing the wireless communication devices to function properly, even in the presence of microwave energy from the operation of the magnetron 106.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
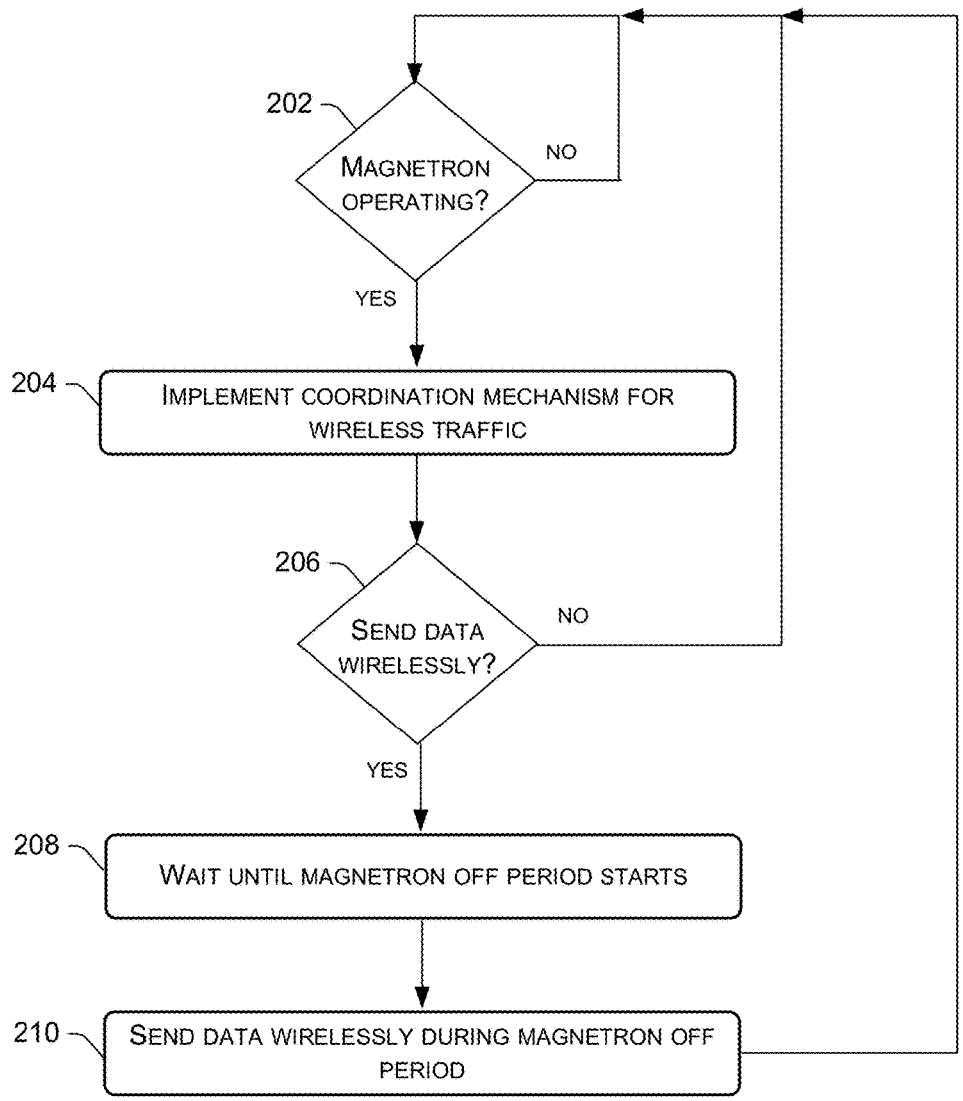
FIG. 2 is a flow diagram of an example process for mitigating microwave interference by coordinating wireless traffic in accordance with an on-and-off cycle of a microwave oven's magnetron.

FIG. 2 is a flow diagram of an example process 200 for mitigating microwave interference by coordinating wireless traffic in accordance with an on-and-off cycle of a microwave oven's magnetron. For discussion purposes, the process 200 is described with reference to the previous figures.

At 202, a wireless communication device may determine whether a magnetron 106 in an environment 108 of the wireless communication device is operating. Here, the wireless communication device may be a microwave oven 102 that includes a wireless transceiver 112 and microwave mitigation logic 126, as shown in FIG. 1, or the wireless communication device may be another device, such as the speech interface device 104 of FIG. 1, collocated in the environment 180 with the microwave oven 102 that is equipped with its own wireless transceiver and microwave mitigation logic. Example techniques for making the determination at block 202 are described in more detail herein. If, at block 202 the wireless communication device determines that the magnetron 106 is not operating, the process 200 may follow the "NO" route from block 202 to iterate the determination at block 202 (e.g., by continually monitoring for operation of the magnetron 106). If, at block 202, the wireless communication device determines that the magnetron 106 is operating, the process 200 may follow the "YES" route from block 202 to block 204.

At 204, the wireless communication device may implement a coordination mechanism (e.g., by sending a CTS packet before the start time of the magnetron's 106 on period) to (i) prevent data from being sent wirelessly in the environment 108 during the on period of the on-and-off cycle of the magnetron 106, and (ii) allow the data to be sent wirelessly in the environment 108 during the off period of the on-and-off cycle of the magnetron 106.

At 206, the wireless communication device may determine whether data is to be sent wirelessly via a wireless transceiver of the wireless communication device. For example, in the case where the wireless communication device is the speech interface device 104 of FIG. 1, the determination at block 206 may be based on capturing an utterance corresponding to user speech via a microphone of the speech interface device 104. If the utterance includes a wakeword, the speech interface device 104 may determine, at block 206, that data (e.g., audio data 124) is to be sent to the remote speech processing system 118 via the AP 120. In the case where the wireless communication device is the microwave oven 102 of FIG. 1, the determination at block 206 may be based on some other event, such as a timer expiring and the microwave oven 102 sending a signal to the speech interface device 104 and/or to the AP 120 in the environment 108. If, at block 206, it is determined that there is no data that is to be sent wirelessly from the wireless communication device, the process 200 may follow the "NO" route from block 206 to iterate blocks 202-206. Accordingly, as long as the magnetron 106 is operating, the wireless communication device can monitor the determination at block 206. If, at block 206, it is determined that data is to be sent wirelessly from the wireless communication device, the process 200 may follow the "YES" route from block 206 to block 208.

At 208, the wireless communication device may wait for a current on period of the on-and-off cycle of the magnetron 106 to lapse, and for the next off period of the on-and-off cycle of the magnetron 106 to start, based on the implementation of the coordination mechanism at block 204. The waiting at block 208 may include queuing the packet until the start time of the magnetron's off period, which might be controlled through microwave mitigation logic (e.g., the logic 126 of FIG. 1), a NAV specified in a CTS packet, or in other ways described herein.

At 210, the wireless communication device may send the data wirelessly during the off period of the on-and-off cycle of the magnetron 106. Using the example where the speech interface device 104 is to send audio data 124 to the remote speech processing system 118 via the AP 120, the sending at block 210 may include sending the audio data 124 representing user speech to the remote speech processing system 118 via the AP 120. As shown by the arrow from block 210 to block 202, the process 200 may iterate such that the wireless communication device sends data wirelessly during the magnetron's 106 off period, and ceases sending the data wirelessly during the magnetron's 106 on period in an iterative fashion, whenever data is to be sent wirelessly in the environment.

It is to be appreciated that the wireless communication device may also receive data during the off period of the magnetron's 106 on-and-off cycle while the magnetron 106 is operating and the coordination mechanism remains implemented. For instance, in the case where the wireless communication device is the microwave oven 102 of FIG. 1, the microwave oven 102 may receive command data 114 during the off period of the on-and-off cycle of the magnetron 106 from a second wireless communication device in the environment 108, such as the speech interface device 104 or the AP 120. In this case, the sending device will have waited until the start of this off period of the magnetron's 106 on-and-off cycle before sending the command data 114 that is received by the microwave oven 102 during the magnetron's 106 off period. Upon receipt of the command data 114, the microwave oven 102 may perform an action based on the command data 114, for example, stopping the microwave oven 102 by stopping the operation of the magnetron 106.

The process 200 illustrates a coordination technique that can be used to mitigate microwave interference through the coordination of wireless traffic in accordance with the on-and-off cycle of the microwave oven's 102 magnetron 106. This can allow for scheduling data transmissions during the magnetron's 106 off periods, including throughput intensive transmissions like an over-the-air (OTA) update, a log upload from the speech interface device 104, etc.

Figure 3:
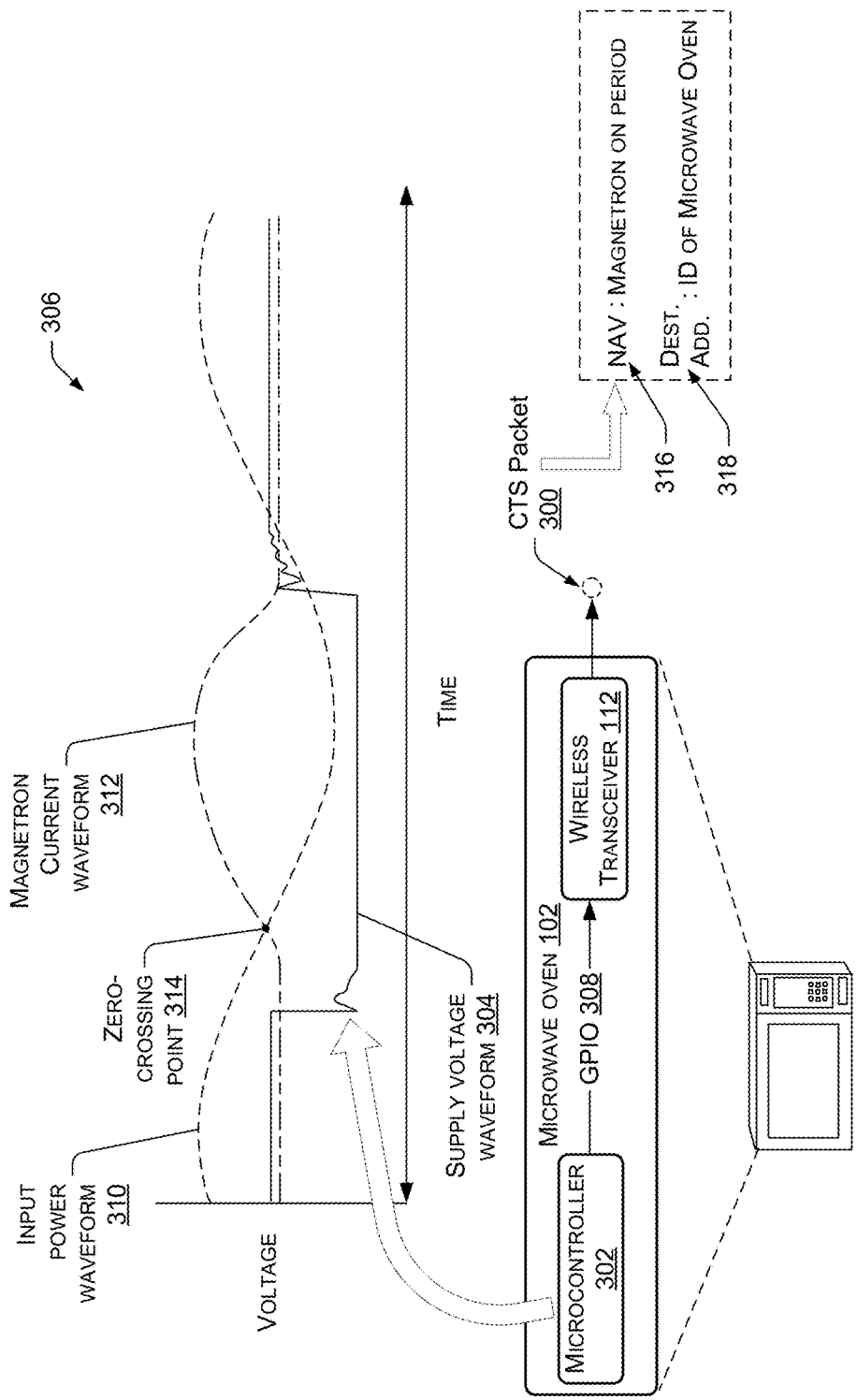
FIG. 3 is a schematic diagram showing an example technique, implemented by a microwave oven, to determine that the microwave oven's magnetron is operating based on a voltage dip in a supply voltage waveform, to determine a start of the magnetron's on period as a time corresponding to a zero-crossing point between an input power waveform and a magnetron current waveform, and to mitigate microwave interference by sending a Clear To Send (CTS) packet before the start time of the magnetron's on period, which coordinates wireless traffic in accordance with an on-and-off cycle of the microwave oven's magnetron.

FIG. 3 is a schematic diagram showing an example technique, implemented by a microwave oven 102, to detect the operation of the microwave oven's 102 magnetron 106, and to mitigate microwave interference by sending a Clear To Send (CTS) packet 300 (sometimes referred to herein as a "CTS-to-self" packet 300) to coordinate wireless traffic. The microwave oven 102 in FIG. 3 is shown as including a microcontroller 302, which may be part of the microwave mitigation logic 126 introduced in FIG. 1. The microcontroller 302 of the microwave oven 102 may be configured to monitor the voltage supplied to the magnetron 106 for purposes of determining whether and when the magnetron 106 is operating. For example, FIG. 3 shows a supply voltage waveform 304 on a Voltage vs. Time graph 306. This supply voltage waveform 304 illustrates how the voltage supplied to the magnetron 106 dips when the magnetron 106 activates and begins to operate. The dip in the supply voltage waveform 304 may occur in response to the user 110 starting the microwave oven 102, for example. In a scenario where the microwave oven 102 is voice-controlled, the microwave oven 102 may be started using a voice command (e.g., the user 110 uttering the expression "Start the microwave"). The voltage dip shown in FIG. 3 may be due to the cathode of the magnetron 106 being supplied with a pulse of negative voltage. In some instances, the peak value of this negative voltage pulse may be up to minus 5,000 volts (V).

Accordingly, when the microcontroller 302 of the microwave oven 102 determines that the voltage supplied to the magnetron 106 transitions from a first voltage value greater than a threshold voltage to a second voltage value less than the threshold voltage, this voltage "dip" may be taken as an indication that the magnetron 106 is operating (e.g., the magnetron 106 has activated and is starting to ramp up), and the microcontroller 302 can respond by providing a signal, via a general purpose input/output (GPIO) 308 to the wireless transceiver 112 (e.g., a WiFi radio chip) of the microwave oven 102. This signal from the microcontroller 302 instructs the wireless transceiver 112 to send a CTS packet 300. The CTS packet 300 is an example coordination mechanism that mitigates the impact of microwave interference by coordinating wireless traffic in accordance with the magnetron's 106 on-and-off cycle. It may take a millisecond or a couple/few milliseconds after the occurrence of the voltage dip in the supply voltage waveform 304 for the magnetron 106 to power up to full operation, which provides enough time to send the CTS packet 300 before the start of the magnetron's 106 on period.

Also shown in the graph 306 of FIG. 3 are two additional waveforms: an input power waveform 310 associated with the magnetron 106 and an electrical current waveform 312 (called the "magnetron current waveform 312" in FIG. 3). The logic 126 of the microwave oven 102 may be configured to determine a start time of the magnetron's 106 on period in the upcoming on-and-off cycle as a time that corresponds to the zero-crossing point 314 between the input power waveform 310 and the electrical current waveform 312. In other words, the time at which the input power waveform 310 and the magnetron current waveform 312 have the same value is the start time of the magnetron's 106 on period. Accordingly, this zero-crossing point 314 can be used to coordinate wireless traffic, such by sending of a CTS packet 300. The CTS packet 300 can be sent, via the wireless transceiver 112 of the microwave oven 102, before the start time of the magnetron's 106 on period (e.g., 500 microseconds before the start time of the magnetron's 106 on period), the start time of the on period corresponding to the zero-crossing point 314 of the input power waveform 310 and the magnetron current waveform 312, as shown in the graph 306 of FIG. 3.

The CTS packet 300 may include, among other information, a Network Allocation Vector (NAV) 316 and a destination address 318. The NAV 316 of the CTS packet 300 specifies a duration, and this duration causes other devices on the same channel that receive the CTS packet 300 to stop transmitting data wirelessly for the specified duration of the NAV 316. This effectively "silences the network" in the environment 108 for a period of time that is specified by the NAV 316 in the CTS packet 300. After that period of time has lapsed, the wireless communication devices that received the CTS packet 300 will start transmitting data wirelessly again. Accordingly, the logic 126 of the microwave oven 102 may be configured to set the NAV 316 to a duration that corresponds to the magnetron's 106 on period. A duration that "corresponds to" the magnetron's 106 on period, as used herein, means a duration that is based on, but not necessarily equal to, the magnetron's 106 on period. For example, the NAV 316 can be set to a duration that is equal to a sum of the duration of the magnetron's on period plus an additional amount of time (e.g., 500 to 700 microseconds) that accounts for the time between sending the CTS packet 300 and the start time of the magnetron's 106 on period, and possibly an additional buffer to be conservative. As mentioned, the magnetron's 106 on period is a function of the input power frequency of the magnetron 106. Thus, a 60 Hz magnetron 106 will have an on period of roughly 8 ms. In this case, the NAV 316 of the CTS packet 300 can be set to a duration that is slightly more than 8 ms (e.g., 8 ms plus 500 microseconds of lead time) in order to "silence the network" for the specified time period, and after that time period has lapsed, wireless data transmission will resume. This technique can be repeated for multiple on-and-off cycles of the magnetron 106 (e.g., by sending a CTS packet 300 every 8-10 ms, depending on the input power frequency of the magnetron 106). In this manner, the wireless traffic in the environment 108 is coordinated in accordance with the on-and-off cycle of the magnetron 106 to mitigate microwave interference. In some embodiments, the iterative performance of this technique may involve the microcontroller 302 detecting the voltage dip in the supply voltage waveform 304 before each on-and-off cycle of the magnetron 106, and sending a separate CTS packet 300 before the start time of each consecutive on period of the magnetron 106.

FIG. 3 shows that the destination address 318 of the CTS packet 300 may be specified as an identifier (ID) (e.g., a media access control (MAC) address) of the sender of the CTS packet 300, which, in this case, is the microwave oven 102. This is why the microwave interference mitigation technique of FIG. 3 is sometimes referred to herein as a "CTS-to-self" technique for coordinating wireless traffic. The CTS packet 300 may be a WLAN packet that is sent (e.g., broadcast) on a particular WiFi channel and which specifies a destination address 318 that corresponds to the sending device. Accordingly, any wireless communication device in the environment 108 on the same channel and within range of the AP 120, and including the AP 120, receives the CTS packet 300, which tells the receiving device(s) to stop transmitting data wirelessly for duration specified in the NAV 316 of the CTS packet 300. Because the destination address 318 specifies a unique ID of the sending device (e.g., a MAC address), the destination address 318 will not match any of the IDs associated with the receiving devices of the CTS packet 300, which causes the receiving devices to defer transmission for the duration specified in the NAV 316. Accordingly, the CTS packet 300 is used to reserve a period of time that corresponds to the magnetron's 106 on period so that packets can be sent wirelessly during the magnetron's 106 off periods when there is no interfering microwave energy in the environment 108, and so that packets are not sent wirelessly during the magnetron's 106 on periods. The logic 126 of the wireless communication device that sent the CTS packet 300 also causes the sending device to refrain from transmitting data wirelessly during the magnetron's 106 on period, and to resume wireless data transmission at the start of the magnetron's 106 off period. Thus, if the microwave oven 102 sends the CTS packet 300, the logic 126 of the microwave oven 102 causes the microwave oven 102 to coordinate wireless data transmission in accordance with the on-and-off cycle of the magnetron 106.

Figure 4:
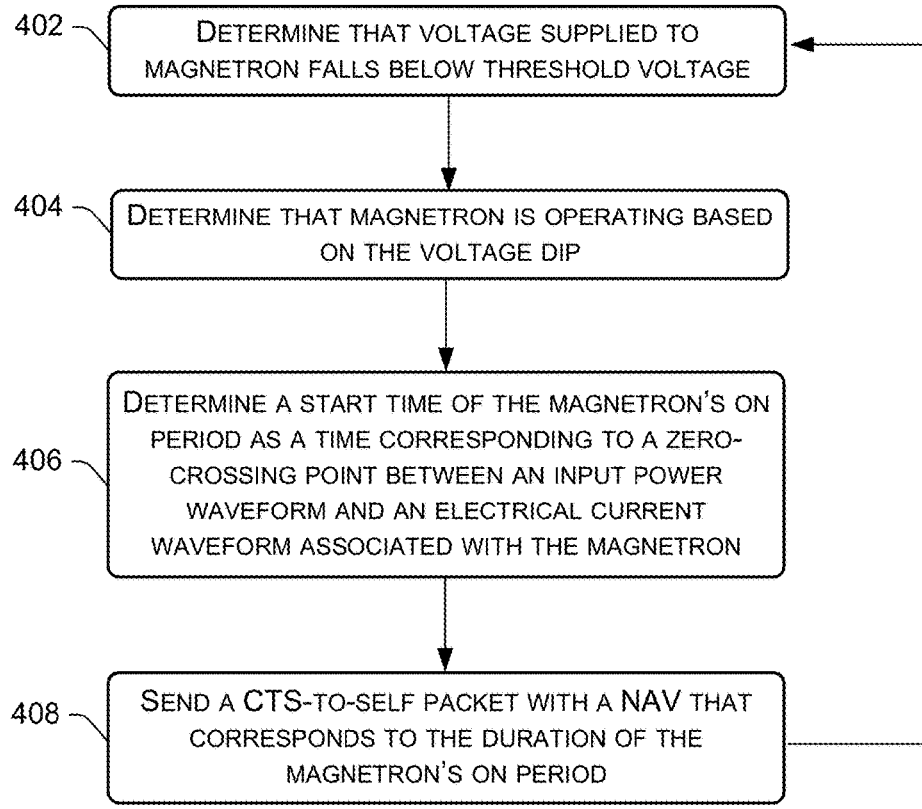
FIG. 4 is a flow diagram of an example process for coordinating wireless traffic to mitigate microwave interference using CTS packets with a zero-crossing point detection scheme.

FIG. 4 is a flow diagram of an example process 400 for coordinating wireless traffic to mitigate microwave interference using CTS packets with a zero-crossing point detection scheme. For discussion purposes, the process 400 is described with reference to the previous figures.

At 402, a microcontroller 302 of a microwave oven 102 may determine that a voltage supplied to the magnetron 106 of the microwave oven 102 transitions from a first voltage value greater than a threshold voltage to a second voltage value less than the threshold voltage. In other words, the microcontroller 302 detects a dip in the supply voltage to the magnetron 106 at block 402.

At 404, the microcontroller 302 determines that the magnetron 106 is operating based on the voltage supplied to the magnetron 106 transitioning from the first voltage to the second voltage (i.e., based on the voltage dip).

At 406, logic 126 of the microwave oven 102 may determine a start time of the on period of the magnetron's 106 on-and-off cycle as a time corresponding to a zero-crossing point 314 between an input power waveform 310 associated with the magnetron 106 and an electrical current waveform 312 associated with the magnetron 106.

At 408, the microwave oven 102 may send (e.g., broadcast), via the wireless transceiver 112 of the microwave oven 102, a CTS packet 300 (e.g., a CTS-to-self packet) before the start time of the magnetron's 106 on period, the start time having been determined at block 406. The CTS packet 300 that is sent at block 408 may include a destination address 316 of the microwave oven 102, and a NAV 318 that that specifies a duration corresponding to the on period of the magnetron's 106 on-and-off cycle (e.g., a duration that encompasses the magnetron's 106 on period, plus an additional amount of time to account for some lead time to send the CTS packet 300). As mentioned, the on period of the magnetron's 106 on-and-off cycle is derivable from an input power frequency of the magnetron 106. In cases where a 60 Hz magnetron 106 is used, the NAV 318 can be set to a duration that is slightly longer than 8 ms.

The process 400 is one example way of implementing a coordination mechanism to mitigate microwave interference by coordinating wireless traffic in accordance with the magnetron's 106 on-and-off cycle. For example, block 202 of the process 200 may include at least the operations performed at blocks 402 and 404 of the process 400, and block 204 of the process 200 may include at least the operations performed at blocks 406 and 408 of the process 400.

Figure 5:
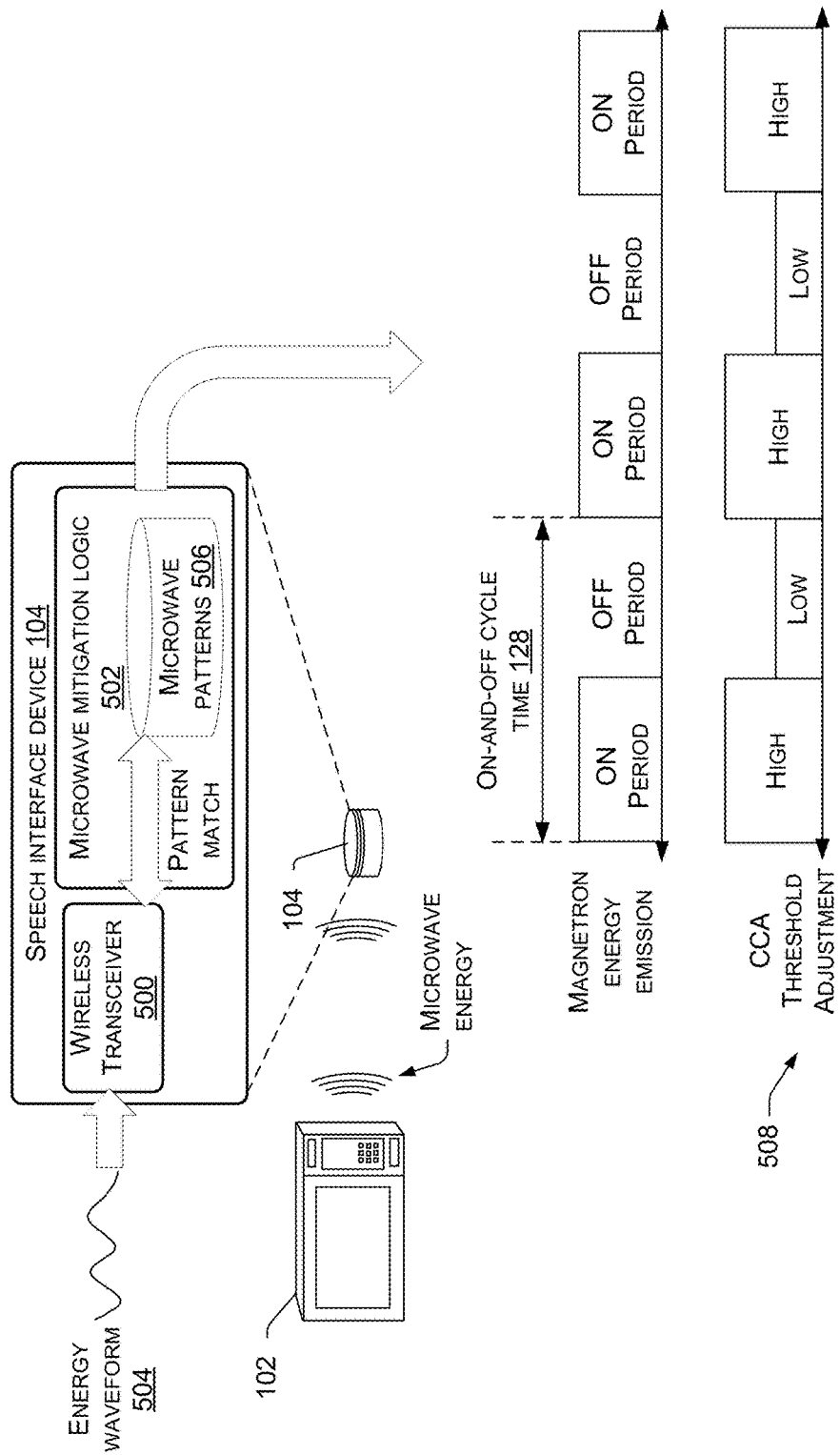
FIG. 5 is a schematic diagram showing an example technique, implemented by a non-microwave device, to detect the operation of a magnetron in the environment, and to mitigate microwave interference through the use of a coordination mechanism that involves dynamically adjusting a Clear Channel Assessment (CCA) threshold in accordance with the on-and-off cycle of the magnetron.

FIG. 5 is a schematic diagram showing an example technique, implemented by a non-microwave device, such as the speech interface device 104 of FIG. 1, to detect the operation of a magnetron in the environment, and to mitigate microwave interference through the use of a coordination mechanism that involves dynamically adjusting a Clear Channel Assessment (CCA) threshold in accordance with the on-and-off cycle of the magnetron. The speech interface device 104 is shown as being equipped with a wireless transceiver 500, such as a WiFi radio chip, a BLE radio chip, or some combination thereof. The speech interface device 104 may also include microwave mitigation logic 502 that is configured to mitigate microwave interference, such as by implementing a coordination mechanism to coordinate wireless traffic in accordance with a magnetron's 106 on-and-off cycle, as described herein.

Specifically, the wireless transceiver 500 of the speech interface device 104, such as a WiFi radio chip, may be configured to detect non-WiFi energy in the environment 108 of the speech interface device 104, including microwave energy. This is a capability of many WiFi radio chips in existence today in the context of using an energy detect Clear Channel Assessment (CCA). A WiFi radio chip, for example, can be used to detect non-WiFi energy in the operating channel and may back off data transmission if the energy exceeds the CCA threshold. CCA thresholds are commonly set to levels of 20-30 decibel-milliwatts (dBm) above a minimum receive (Rx) sensitivity of the WiFi radio chip. This mechanism of the WiFi radio chip can be used to monitor the energy (radiation) on the operating channel of the speech interface device 104 for purposes of detecting microwave energy that is indicative of the present operation of the microwave oven's 102 magnetron 106.

Accordingly, the logic 502 of the speech interface device 104 can use the wireless transceiver 500 to determine an energy waveform 504 that is present in the environment 108 of the speech interface device 104, and then use a pattern matching algorithm to determine whether the detected energy waveform 504 matches a pattern associated with microwave energy. To do this, the logic 502 may compare the detected energy waveform 504 to a repository (e.g., database) of microwave patterns 506 stored in memory that is accessible to the speech interface device 104, such as a repository of microwave patterns 506 stored in local memory of the speech interface device 104. If the detected energy waveform 504 matches a pattern of multiple known microwave energy patterns 506, the speech interface device 104 may take this as an indication that a magnetron 106 in the environment 108 is currently operating. For example, the magnetron 106 of a nearby microwave oven 102 may be operating and may be the source of the energy waveform 504 detected using the wireless transceiver 500 of the speech interface device 104.

Once the operation of the magnetron 106 has been detected, the energy waveform 504 can be analyzed to determine a start time of the magnetron's 106 on period and a start time of the magnetron's 106 off period of an on-and-off cycle (and/or for multiple on-and-off cycles). As mentioned, the on-and-off cycle of a given magnetron 106 is deterministic, and based on this knowledge, the start times of each period of the magnetron's 106 on-and-off cycle can be determined by extrapolating out from a portion of a detected energy waveform 504 that has been determined to be a microwave energy waveform 504.

With this timing information in hand, the speech interface device 104 can implement a coordination mechanism to mitigate microwave interference that involves a CCA threshold adjustment 508 to dynamically adjust the CCA threshold of the wireless transceiver 500 in accordance with the on-and-off cycle of the magnetron 106 (as determined from the analysis of the energy waveform 504). This is shown in FIG. 5 by the alignment of the CCA threshold adjustments and the individual periods of the on-and-off cycle of the magnetron 106. For instance, the logic 502 of the speech interface device 104 can mitigate microwave interference by increasing the CCA threshold at the start time of the magnetron's 106 on period from a first threshold value to a second threshold value (labeled "HIGH" in FIG. 5) that is greater than the first threshold value, and by decreasing the CCA threshold at the start time of the magnetron's 106 off period from the second threshold value to the first threshold value (labeled "LOW" in FIG. 5). This may iterate to dynamically adjust the CCA threshold in order to coordinate the wireless traffic being sent from the speech interface device 104 in the presence of microwave energy. The lower CCA threshold during the magnetron's 106 off period allows the wireless communication device to receive low RSSI signals, while holding off data transmissions during the magnetron's 106 on period.

Figure 6:
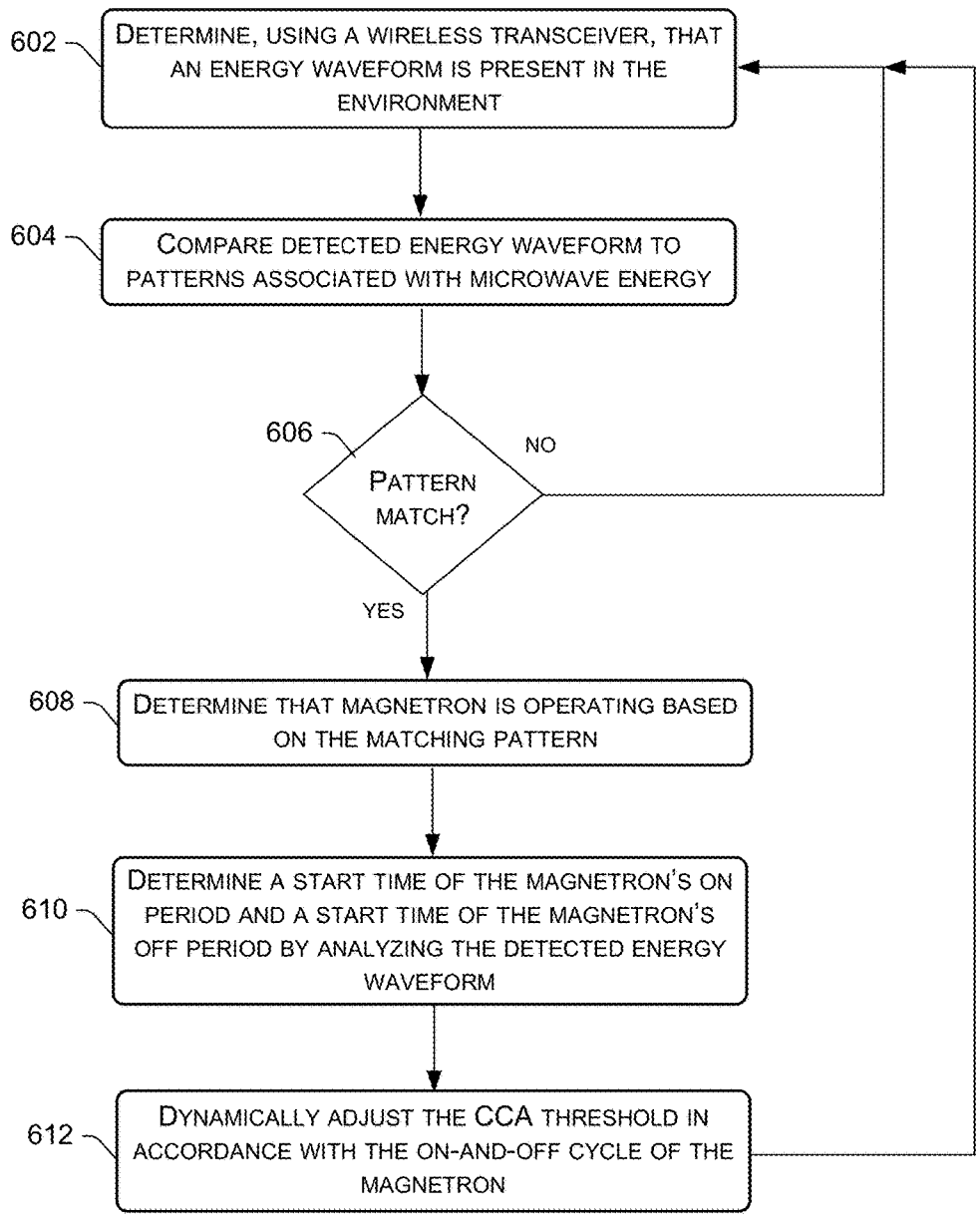
FIG. 6 is a flow diagram of an example process for coordinating wireless traffic to mitigate microwave interference using a CCA adjustment technique with a pattern matching detection scheme.

FIG. 6 is a flow diagram of an example process 600 for coordinating wireless traffic to mitigate microwave interference using a CCA adjustment technique with a pattern matching detection scheme. For discussion purposes, the process 600 is described with reference to the previous figures.

At 602, logic 502 of a wireless communication device, such as the speech interface device 104 of FIG. 1, may use a wireless transceiver 500 of the wireless communication device to determine an energy waveform 504 present in the environment 108 of the wireless communication device.

At 604, the logic 502 of the wireless communication device may compare the detected energy waveform 504 to a repository of patterns 506 that are representative of different microwave energy waveforms to see if the energy waveform 504 matches any of the microwave energy patterns.

At 606, a determination is made as to whether the energy waveform 504 matches any of the patterns known to be representative of microwave energy. Any suitable pattern matching algorithm may be used for this purpose, and may use a similarity metric to determine if the energy waveform 504 "matches" a microwave energy pattern. Matching, in this sense, may mean substantially matching by having a waveform that is within a threshold of a stored pattern in terms of both energy values and the period of the waveform. If a match is not found at 606, the process 600 may follow the "NO" route from block 606 to iterate the process 600 by returning to block 602 until another energy waveform 504 is detected. If the logic 502 determines, at block 606, that the energy waveform 504 matches a pattern 506 associated with microwave energy, the process 600 may follow the "YES" route from block 606 to block 608.

At 608, the logic 502 may determine that a magnetron 106 in the environment 108 is operating based at least in part on determining that the energy waveform 504 matches the pattern 506 associated with the microwave energy.

At 610, the logic 502 may determine a start time of the magnetron's 106 on period and a start time of the magnetron's 106 off period (over the course of an on-and-off cycle of the magnetron 106) based at least in part on the energy waveform 504 detected at block 602. This analysis may look at the time periods over which microwave energy is present in the environment 108 based on the energy waveform 504, and may extrapolate to determine start times of individual periods in an upcoming on-and-off cycle. This can be performed based on the notion that the magnetron's 106 on-and-off cycle is deterministic in terms of the frequency and the duty cycle. Accordingly, start times of the magnetron's 106 on and off periods can be predicted with reasonable accuracy.

At 612, the CCA threshold of the wireless transceiver 500 can be dynamically adjusted in accordance with the on-and-off cycle of the magnetron 106. The adjustment of the CCA threshold at block 612 can include increasing the CCA threshold at the start time of the magnetron's on period from a first threshold value to a second threshold value that is greater than the first threshold value, and decreasing the CCA threshold at the start time of the following off period of the magnetron's 106 cycle from the second threshold value back to the first threshold value. As shown by the arrow from block 612 to block 602, the process 600 may iterate such that the wireless communication device determines that the magnetron 106 is operating and dynamically adjusts the CCA threshold in an iterative fashion.

The process 600 represents another example coordination mechanism that may be implemented by any wireless communication device described herein, especially those that are non-microwave devices, such as the speech interface device 104, which does not have the luxury of monitoring the voltage supplied to the microwave oven's 102 magnetron 106. For example, block 202 of the process 200 may include at least the operations performed at blocks 602-608 of the process 600, and block 204 of the process 200 may include at least the operations performed at blocks 610 and 612 of the process 600. It is also to be appreciated that a microwave oven 102 equipped with microwave mitigation logic 126 can perform the process 600 in the same manner described above with reference to the speech interface device 104, although the microwave oven 102 can additionally, or alternatively, employ the technique described with respect to the process 400 of FIG. 4 to mitigate microwave interference through a coordination mechanism that coordinates wireless traffic in accordance with the magnetron's on-and-off cycle. Furthermore, although the CCA threshold adjustment technique is described with reference to the process 600, it is to be appreciated that the "CTS to self" technique of FIGS. 3 and 4 can be used with the pattern matching technique of FIGS. 5 and 6. That is, instead of adjusting the CCA threshold at block 612 as a mechanism for coordinating wireless traffic, the wireless communication device can, in the alternative, send a CTS packet, as described with reference to block 408 of the process 400. Likewise, the process 400 can be modified by using the CCA threshold adjustment mechanism at block 612 as a mechanism for coordinating wireless traffic instead of sending the CTS packet at block 408.

Yet another technique for coordinating wireless traffic as a means of mitigating microwave interference is to send a NULL frame before the start of each period of the magnetron's 106 on-and-off cycle. NULL data frames contain an empty frame body, but carry control information to notify another device of something. In this case, the microwave oven 102, for example, can set a bit in the NULL frame to a first value that causes a receiving AP 120 to wait for a follow-up NULL frame before sending packets wirelessly to the microwave oven 102. This NULL frame with the first value can be sent before the start time of magnetron's 106 on period to "silence" the AP 120 during the magnetron's 106 on period. Subsequently, the microwave oven 102 can set the bit in a next NULL frame to a second value that causes the receiving AP 120 to resume sending packets wirelessly to the microwave oven 102. This NULL frame approach is yet another coordination mechanism that can be implemented to coordinate wireless traffic in accordance with the magnetron's 106 on-and-off cycle as a microwave interference mitigation technique. As yet another example coordination mechanism, a BLE packet can be sent to the AP carrying similar information to that described above with respect to the NULL frame (e.g., a control bit in the BLE packet). Coordinating wireless traffic as a means for mitigating microwave interference allows for utilizing packets of any suitable size (e.g., 1500 bytes) because the wireless communication devices in the environment will not invoke a rate scaling mechanism that would otherwise be invoked if the traffic was not coordinated. The following discussion describes more detail surrounding a microwave interference mitigation technique that reduces a maximum packet size for data packets, which may be used with, or without, the coordination mechanisms described herein.

Figure 7:
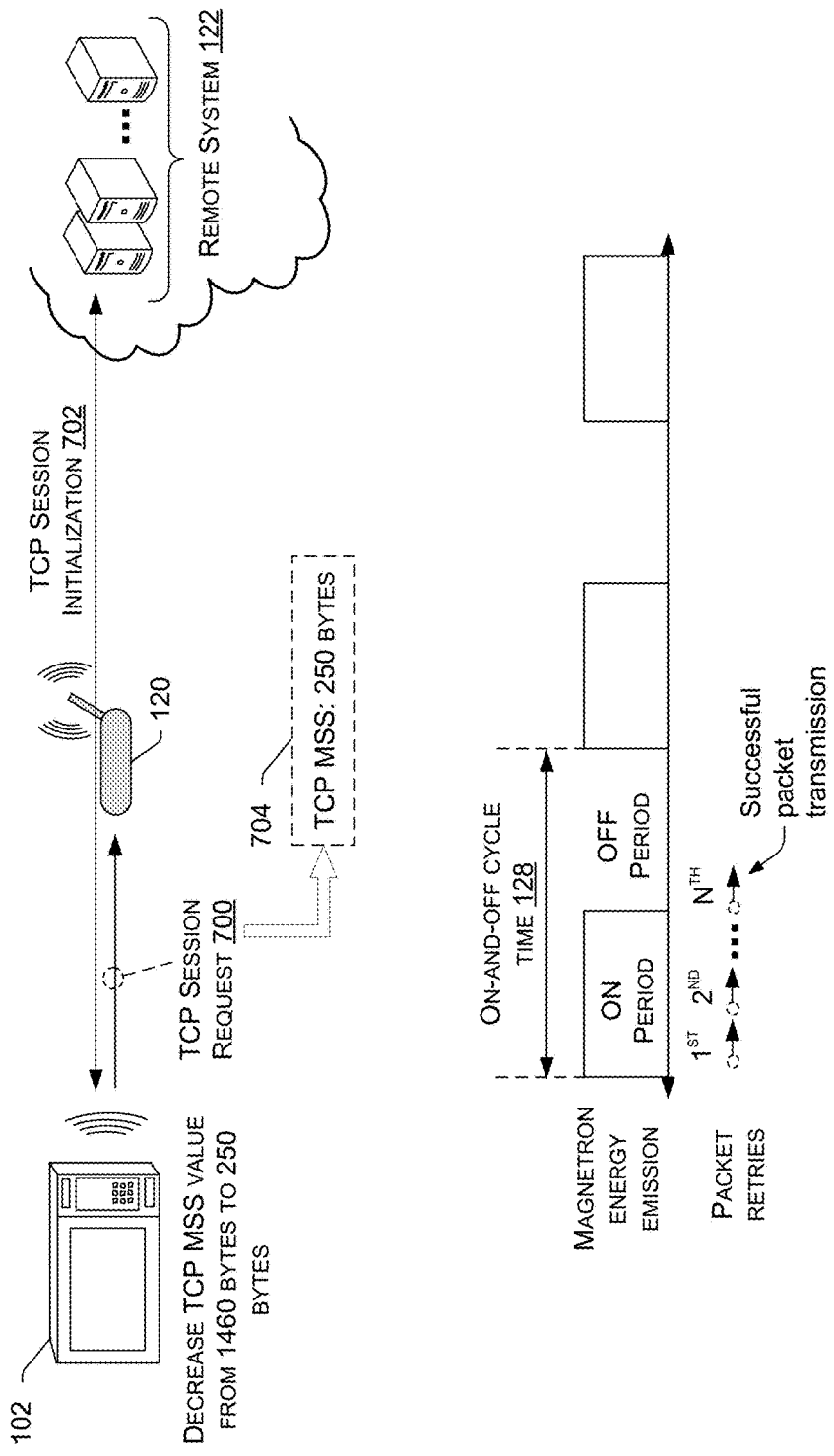
FIG. 7 is a schematic diagram showing an example microwave interference mitigation technique that involves decreasing a maximum packet size to ensure that a packet can be successfully transmitted during the off period of the magnetron's on-and-off cycle.

FIG. 7 is a schematic diagram showing an example microwave interference mitigation technique that involves decreasing a maximum packet size to ensure that a packet can be successfully transmitted during the off period of the magnetron's on-and-off cycle. In FIG. 7, the microwave oven 102 is shown as sending a Transmission Control Protocol (TCP) session request 700. This TCP session request 700 can be sent to a remote system 122 via the AP 120 as part of a negotiation with the remote system 122 to initialize a TCP session (i.e., TCP session initialization 702) so that data can be communicated between the two endpoints over a wide area network (e.g., the Internet) during the TCP session. The microwave oven 102 may send a TCP session request 700 periodically and/or in response to particular events. That is, the TCP session request 700 can be sent at any suitable time for purposes of negotiating, or renegotiating, parameters for a TCP session. One of the parameters that is negotiated for the TCP session is a TCP Maximum Segment Size (MSS) value 704, which places a limitation (e.g., a cap) on the maximum allowable size of packets that are to be transmitted as part of the TCP session between endpoints that participate in the TCP session. An example of a standard maximum packet size is 1500 bytes, which is suitable for wireless data communication in the environment 108 when the microwave oven 102 is not running (and hence, the magnetron 106 is not operating). As will be described in more detail below, 1500 byte packets may be too large in instances where a coordination mechanism is not employed and microwave energy is present in the environment 108 due to the operation of the magnetron 106 of the microwave oven 102.

FIG. 7 illustrates a microwave interference mitigation technique that involves decreasing the TCP MSS value 704 from a first size value (e.g., 1460 bytes) to a second size value (e.g., 250 bytes) that is less than the first size value. 1460 bytes and 250 bytes are merely example values, and it is to be appreciated that any other numerical values for the TCP MSS value 704 may be utilized for this microwave interference mitigation technique. An initial TCP MSS value 704 of 1460 bytes is a common TCP MSS value 704 that is usable cap a maximum packet size at roughly 1500 bytes. This is because the TCP MSS value 704 does not typically account for the size of headers (e.g., WiFi headers, TCP/IP headers, etc.). In any case, this decreased TCP MSS value 704 may be sent in the TCP session request 700, by the microwave oven 102, to the remote system 122, via the AP 120. With the TCP MSS value 704 set to a reduced value (e.g., 250 bytes), the bi-directional over-the-air (OTA) packet size for all network links involved in the TCP session is limited by this maximum TCP MSS value of 250 bytes so that packets transmitted wirelessly during the TCP session cannot exceed a reduced maximum size that is roughly 250 bytes (e.g., slightly greater than 250 bytes). The TCP MSS value 704 adjustment allows for both uplink and downlink maximum packet size to be controlled from the device side, without any proprietary infrastructure or server side changes. This means that any wireless communication device in the environment 108 can dynamically enable this packet size reduction mechanism at run time to mitigate microwave interference.

The bottom portion of FIG. 7 illustrates how this packet size reduction technique can mitigate microwave interference. Consider a case where the microwave oven 102 is running (i.e., emitting microwave energy due to the operation of the magnetron 106) and the AP 120 is trying to send data wirelessly (e.g., to the microwave oven 102 or to the speech interface device 104). With packets limited in size to about 250 bytes, the AP 120 may send a first packet of 250 bytes at the beginning of the magnetron's 106 on period, which fails because of the microwave interference from the magnetron 106, and the packet is dropped without the AP 120 receiving an ACK message. The AP 120 is configured to scale down its data rate and retry sending the data in a second packet at the scaled down data rate. For instance, if the first 250 byte packet was sent at a data rate of 54 Mbps, this attempt would take about 0.04 ms, and the AP 120 is configured to retry sending a second 250 byte packet at a reduced data rate of say, 48 Mbps. The second attempt would take about 0.04 ms and would fail as well because the second 250 byte packet is also sent during that magnetron's 106 on period. This rate scaling continues as ACK messages are not received, and the AP 120 quickly scales down to a data rate that can be as low as 1 Mbps. At 1 Mbps, each 250 byte packet is sent in about 2 ms. Eventually, on the $N^{th}$ retry, a 250 byte packet is sent at the beginning of the magnetron's 106 off period, and, assuming that nothing else disrupts the transmission of the packet, the 250 byte packet is received by the target device (e.g., the microwave oven 102). Because each 250 byte packet at a data rate of 1 Mbps takes about 2 ms to send, subsequent packets may be sent during the magnetron's 106 off period with the potential to successfully transmit up to four packets that are 250 bytes in size during a single off period of the magnetron 106. Even in a worst case, the 250 byte packet size guarantees enough time for at least three retransmissions to deliver a data wirelessly in a 250 byte packet during the magnetron's 106 off period, which yields to 100% successful wireless packet transmission and reception, even in the presence of microwave energy, albeit with reduced throughput due to the high overhead of sending more ACK messages to send the same amount of data, as compared to a case where larger-size packets are used (e.g., 1500 byte packets). It is to be appreciated that 250 bytes is merely an example maximum TCP MSS value 704 that is suitable for mitigating microwave interference, and that other maximum packet sizes are contemplated. In some embodiments, the TCP MSS value 704 can be reduced to a size value that is within a range of 200 bytes to 300 bytes.

To illustrate how microwave interference impacts wireless data transmission when the maximum packet size is not reduced, consider a case where the AP 120 attempt to send a first 1500 byte packet to the microwave oven 102 at the beginning of the magnetron's 106 on period, but fails to do so because of the microwave interference. At an initial data rate of 54 Mbps, this first attempt takes about 0.22 ms, and the AP 120 would scale down its data rate to a lower data rate of say, 48 Mbps, and would retry a second 1500 byte packet at 48 Mbps. This second attempt would take about 0.25 ms, and it would also fail because it is attempted during the magnetron's 106 on period. This continues by quickly scaling the data rate down to a floor of say, 1 Mbps. Eventually, the magnetron's 106 off period begins, and a retransmission of the 1500 byte packet is attempted at a scaled down data rate of 1 Mbps. At this low data rate, it takes about 12 ms to transmit one 1500 byte packet, which is too long to fit within the magnetron's 106 off period, which is typically in the range of 8-10 ms, wherein the actual duration of the off period depending on the input power frequency of the magnetron 106. Thus, without reducing the maximum packet size from 1500 bytes, and without any coordination to ensure that wireless traffic is not sent during the magnetron's 106 on period, one can readily appreciate why microwave interference has an adverse impact on wireless data communication.

As mentioned above, the maximum packet size can be reduced, as shown in FIG. 7, using a "brute force" approach where all packets are limited to 250 bytes, without any concern as to whether the magnetron 106 is operating or not. In other words, the maximum packet size can be reduced to a lower-than-standard packet size as a failsafe mechanism to ensure that data is transmitted successfully in the presence of microwave energy, albeit with reduced throughput. In this scenario, a TCP timestamp can be added to each reduced-size packet. This is because, with a reduced-size packet, a higher number of retransmissions and dropped packets occur, as compared to using standard size packets of say, 1500 bytes. This means that the round trip time of a 250 byte packet can vary dramatically across multiple transmissions, and when this occurs, the retransmission time may be increased by the wireless communication device to avoid unnecessary transmissions where a packet may be dropped. This retransmission time can be delayed by amounts up to 2 minutes, in some cases, where the wireless communication device holds data without transmitting for the duration of that period. A TCP timestamp added to each reduced-size packet can prevent this from happening because both parties of a wireless data transmission can calculate the actual round trip time from the TCP timestamp, and the retransmission time will not increase to the worst case value.

In some embodiments, the maximum packet size can be reduced, as shown in FIG. 7, along with a dynamic CCA threshold adjustment, similar to that shown in FIG. 5. For example, with the maximum packet size is reduced (e.g., TCP MSS value 704 set to 250 bytes), the CCA threshold can be increased during the magnetron's 106 on period, and the CCA threshold can be decreased during the magnetron's 106 off period, which may help to receive the reduced-size packets in the presence of microwave energy.

Besides a brute force approach, however, compute resources and throughput may be optimized using a selective and/or dynamic approach to reducing the maximum packet size on an as-needed basis. In some embodiments, the techniques described herein (e.g., voltage monitoring, pattern matching, etc.) can be used to determine that the magnetron 106 is currently operating, and, in response, the wireless communication device (e.g., the microwave oven 102, the speech interface device 104, etc.) can renegotiate the TCP MSS value 704 with the remote system 122 to reduce the maximum packet size in accordance with a reduced TCP MSS value 704 of say, 250 bytes. After operation of the magnetron 106 has ceased, the TCP MSS value 704 can be renegotiated to the higher value of say, 1460 bytes. Other examples of selectively and/or dynamically reducing the maximum packet size are discussed with reference to the following figures.

Figure 8:
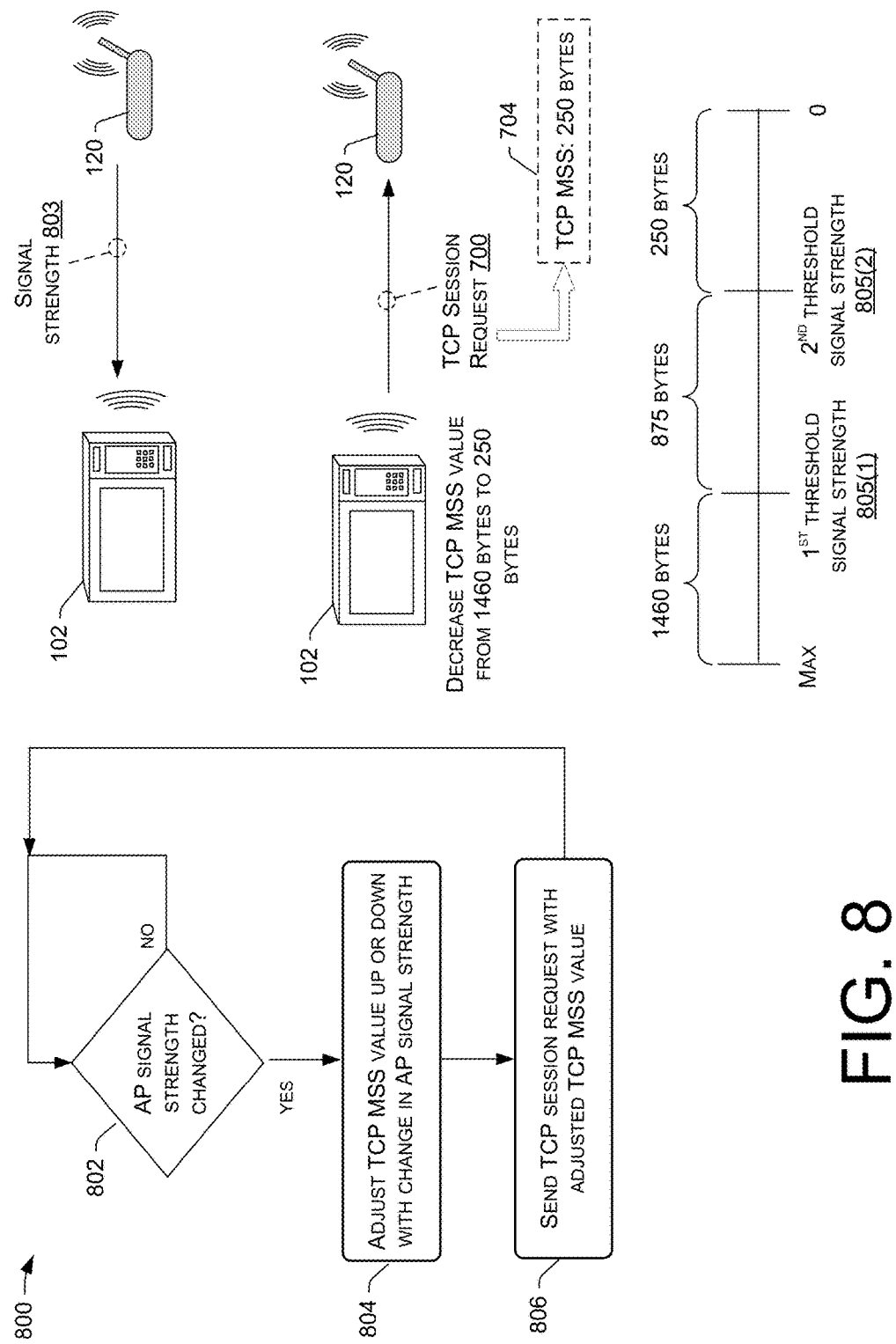
FIG. 8 is a pictorial flow diagram of an example process for selectively and/or dynamically decreasing a maximum packet size based on a measured signal strength of an access point (AP) in an environment of a microwave oven.

FIG. 8 is a pictorial flow diagram of an example process 800 for selectively and/or dynamically decreasing a maximum packet size based on a measured signal strength of an access point (AP) in an environment of a microwave oven. For discussion purposes, the process 800 is described with reference to the previous figures.

At 802, a wireless communication device, such as the microwave oven 102 of FIG. 1, may determine that a signal strength 803 (e.g., received signal strength indication (RSSI)) of an AP 120 in the environment 108 of the wireless communication device has changed, since a previous signal strength measurement. For example, the determination at block 802 may be a determination as to whether the signal strength 803 of the AP 102 has decreased from a first signal strength value to a second signal strength value that is less than the first signal strength value. If the signal strength 803 has not changed (e.g., decreased) at block 802, the process 800 may follow the "NO" route from block 802 to iterate the determination at 802 (i.e., by monitoring the AP 120 signal strength 803 periodically, in response to events, such as rebooting the device, moving the device to a different location, etc.). If the signal strength 803 has changed (e.g., decreased) at block 802, the process 800 may follow the "YES" route from block 802 to block 804.

At 804, a TCP MSS value may be adjusted by the wireless communication device, up or down with the change in AP 120 signal strength 803. For example, if the AP 120 signal strength 803 weakened at block 802, the TCP MSS value may be decreased at block 804 from a first TCP MSS value to a second TCP MSS value that is less than the first TCP MSS value (e.g., from 1460 bytes to a size value that is less than 1460 bytes). In some embodiments, the TCP MSS value 704 is scaled by an amount that is in accordance with (e.g., proportional to) the amount of change in the AP 120 signal strength 803. In other words, the TCP MSS value 704 may be calculated based on current measurement of the AP 120 signal strength 803 using any suitable mathematical formula or relationship. For instance, AP 120 signal strength 803 may vary in such a way that the data rate between the microwave oven 102 and the AP 120 swings between 54 Mbps and 1 Mbps. This may be due to the user 110 moving the devices to different locations in the environment 108, or due to variability in radio conditions, obstructions, etc. Accordingly, the TCP MSS value 704 may be calculated to a size value within a range of 1460 bytes and 250 bytes, depending on the AP 120 signal strength 803, where 54 Mbps may correspond to a TCP MSS value 704 of 1460 bytes, 1 Mbps may correspond to a TCP MSS value 704 of 250 bytes, and values in between can be interpolated using a linear function.

In some embodiments, any number of signal strength thresholds can be used for the adjustment of the TCP MSS value at block 804. For example, a single signal strength threshold may be specified, and, if the AP 120 signal strength 803 is determined to have decreased to a signal strength value that is below the threshold signal strength, the TCP MSS value 704 may be decreased, say, from 1460 bytes to 250 bytes. If the AP 120 signal strength 803 were to cross this threshold signal strength in the reverse direction, the TCP MSS value 704 may be increased from 250 bytes back to 1460 bytes. Thus, a binary toggling approach can be employed where the TCP MSS value 704 is toggled between two size values depending on whether the AP 120 signal strength 803 is less than or greater than a threshold signal strength. In some embodiments, multiple signal strength thresholds can be used. FIG. 8 illustrates an example where a first threshold signal strength 805(1) and a second threshold signal strength 805(2) less than the first threshold signal strength 805(1) are defined. Accordingly, if, at block 802, it is determined that the signal strength 803 of the AP 120 has decreased from a first signal strength value greater than the first threshold signal strength 805(1) to a second signal strength value less than the first threshold signal strength 805(1), the wireless communication device, at block 804, may decrease the TCP MSS value 704 from a first TCP MSS value (e.g., 1460 bytes) to a second TCP MSS value (e.g., 875 bytes) that is less than the first size value. Likewise, if, at block 802, it is determined that the signal strength 803 of the AP 120 has decreased from the second signal strength value between the first threshold signal strength 805(1) and the second threshold signal strength 805(2) to a third signal strength value less than the second threshold signal strength 805(2), the wireless communication device, at block 804, may decrease the TCP MSS value 704 from the second TCP MSS value (e.g., 875 bytes) to a third TCP MSS value (e.g., 250 bytes) that is less than the second TCP MSS value.

At 806, the wireless communication device may send a TCP session request 700 (with the TCP MSS value 704 set to the adjusted size value) to a remote system 122 via the AP 120. As shown by the arrow from block 806 to block 802, the process 800 may iterate such that the wireless communication device can adjust the maximum packet size up or down in an iterative fashion, responsive to changes (increase or decrease) in the AP 120 signal strength 803. It is to be appreciated that the approach of FIG. 8 can be used in combination with the coordination mechanisms described herein to coordinate wireless traffic in accordance with the on-and-off cycle of the magnetron 106. This combinatorial approach to microwave interference mitigation can optimize compute resources and throughput during wireless data transmission in the environment 108. The use of wireless traffic coordination also allows for reductions in the maximum packet size by smaller amounts than with the brute force approach. For example, it may be enough to reduce the TCP MSS value 704 to a size value that is between 1460 bytes and 250 bytes for a wireless communication device to function properly without any impact from microwave interference, depending on the AP 120 signal strength and associated data rate with respect to that wireless communication device. In some cases—notwithstanding the implementation of a coordination mechanism to mitigate microwave interference—a wireless communication device, such as the microwave oven 102, may be spaced far enough from the AP 120 that the data rate is effectively as low as 1 Mbps.

In this case, the microwave oven 102 may monitor the signal strength 803 of the AP 120, and, so long as the signal strength is low enough, the TCP MSS value 704 may remain at a reduced value (e.g., 250 bytes), unless and until the signal strength 803 increases and data rate improves, whereby the maximum packet size can be increased.

Although FIG. 8 describes an approach that measures the signal strength 803 of the AP 120, it is to be appreciated that other ways of determining the "strength" of the connection with the AP 120 are also contemplated for use with the process 800, such as by determining at error rate at block 802 (instead of, or in addition to, determining the signal strength 803).

Figure 9:
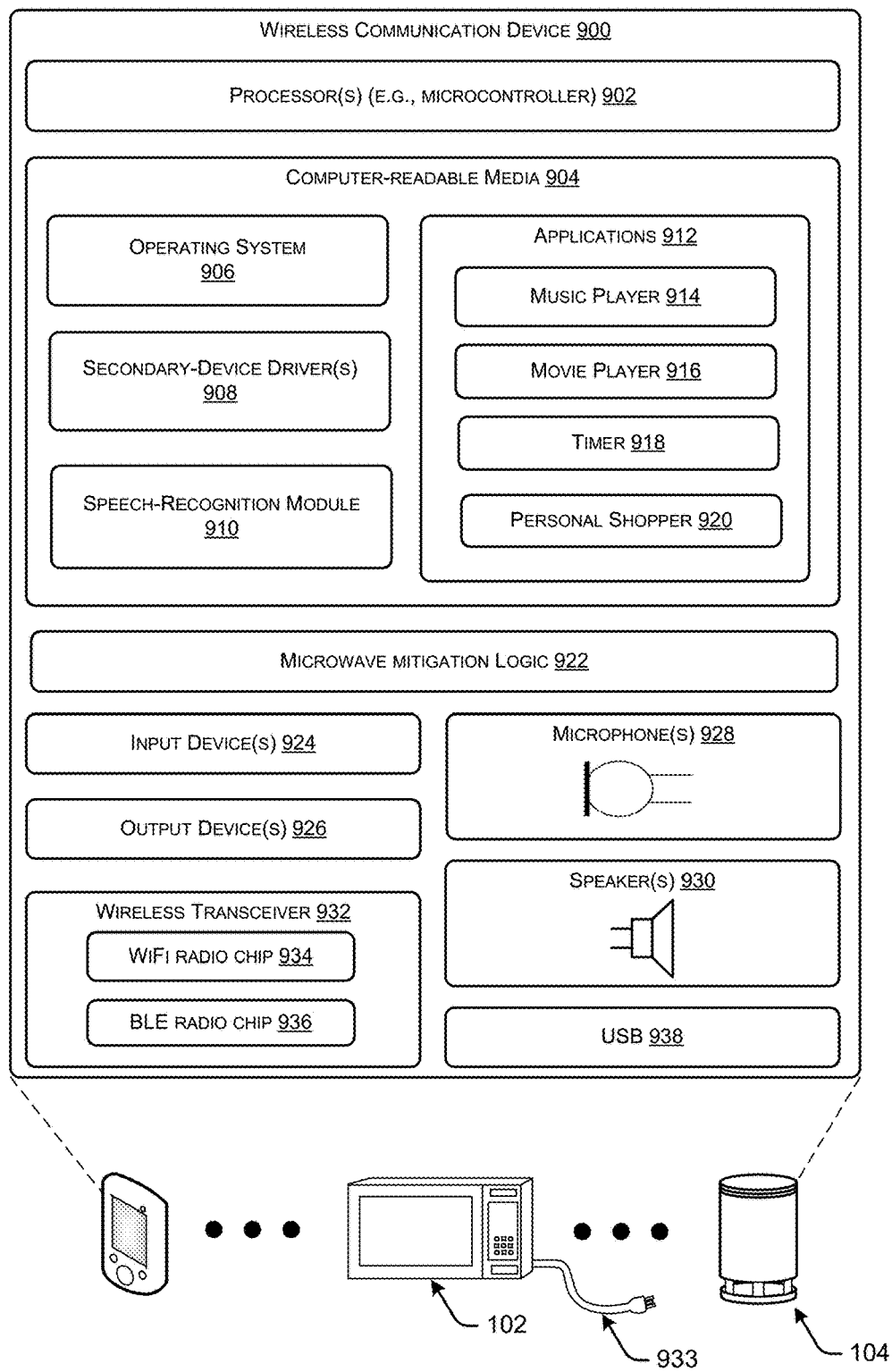
FIG. 9 illustrates example components of a wireless communication device, such as the microwave oven or the speech interface device of FIG. 1.

FIG. 9 illustrates example components of a wireless communication device 900, such as the microwave oven 102 or the speech interface device 104 of FIG. 1. The wireless communication device 900 may be implemented with the ability to receive and output audio, in some cases. In general, the wireless communication device 900 may also be implemented with a network interface (wireless or wire-based), power, and processing/memory capabilities. The wireless communication device 900 may also be implemented in other form factors, such as a mobile device (e.g., a smart phone or personal digital assistant). The wireless communication device 900 may, in some cases, include a touch-sensitive display screen and various buttons for providing input.

In the illustrated implementation, the wireless communication device 900 includes one or more processors 902 and computer-readable media 904. In some implementations, the processors(s) 902 may include a microcontroller (e.g., the microcontroller 302 of FIG. 3), a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 902 may possess its own local memory, which also may store program modules, program data, and/or one or more operating systems.

The computer-readable media 904 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 904 may be implemented as computer-readable storage media ("CRSM"), which may be any available physical media accessible by the processor(s) 902 to execute instructions stored on the memory 904. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 902.

Several modules such as instruction, datastores, and so forth may be stored within the computer-readable media 904 and configured to execute on the processor(s) 902. A few example functional modules are shown as applications stored in the computer-readable media 904 and executed on the processor(s) 902, although the same functionality may alternatively be implemented in hardware, firmware, or as a system on a chip (SOC).

An operating system module 906 may be configured to manage hardware within and coupled to the wireless communication device 900 for the benefit of other modules. In addition, in some instances the wireless communication device 900 may include some or all of one or more secondary-device drivers 908 to control second devices. The wireless communication device 900 may further including, in some instances, a speech-recognition module 910, which may correspond to a local speech processing component with capabilities to at least recognize a wakeword.

The wireless communication device 900 may also include a plurality of applications 912 stored in the computer-readable media 904 or otherwise accessible to the wireless communication device 900. These applications 912 can include a voice services component to interact with the remote system 122, including the remote speech processing system 118 for responding to user speech. In the example of FIG. 9, the applications 912 include a music player 914, a movie player 916, a timer 918, and a personal shopper 920. However, the wireless communication device 900 may include any number or type of applications and is not limited to the specific examples shown here. The music player 914 may be configured to play songs or other audio files. The movie player 916 may be configured to play movies or other audio visual media. The timer 918 may be configured to provide the functions of a simple timing device and clock. The personal shopper 920 may be configured to assist a user in purchasing items from web-based merchants.

The wireless communication device 900 further includes microwave mitigation logic 922 (e.g., software, hardware, and/or firmware, etc., and sometimes referred to as "logic 922"), which may represent either the logic 126 introduced in FIG. 1, or the logic 502 introduced in FIG. 5. The logic 922 may enable performance of the techniques described herein for mitigating microwave interference.

Generally, the wireless communication device 900 has input devices 924 and output devices 926. The input devices 924 may include, without limitation, a keyboard, keypad, mouse, touch screen, joystick, control buttons, etc. In some implementations, one or more microphones 928 may function as input devices 924 to receive audio input, such as user voice input. The output device(s) 926 may include, without limitation, a display(s), a light element (e.g., LED), a vibrator to create haptic sensations, or the like. In the case of a microwave oven 102, the output devices 926 may include a magnetron 106 for outputting microwave energy to head food within the microwave oven 102. In some implementations, one or more speakers 930 may function as output devices 926 to output audio sounds (e.g., audio content, TTS responses, tones at various frequencies, etc.).

A user 110 may interact with the wireless communication device 900 by speaking to it, or to a different speech interface device in the environment 108. The wireless communication device 900 may be controllable (e.g., started and stopped) via these voice commands, and, in some cases, can communicate back to the user 110 by emitting audible statements through the speaker 930. In this manner, the user 110 can interact with the wireless communication device 900 solely through speech, without use of a keyboard or display.

The wireless communication device 900 may further include a wireless transceiver 932, which may be similar to the wireless transceiver 112 or the wireless transceiver 500 described in the earlier figures. The wireless transceiver 932 facilitates a wireless connection to a network and may include, without limitation, a WiFi radio chip 934, a BLE radio chip 936, and/or any other suitable type of wireless transceiver 932. The wireless transceiver 932 may implement one or more of various wireless and/or IoT technologies, such as WiFi protocol, any 802.1x protocol, Bluetooth protocol, BLE protocol, ZigBee protocol, Z-wave protocol, and/or any other type of protocol usable to communicate wirelessly between electronic devices in an environment, including those that do and/or do not rely data transmission over the wide area network (e.g., the Internet). As such, the wireless communication device 900 may be configured to act as a hub that can communicate with second devices in the environment and control the second devices, such as by using protocol stacks, drivers, and adapters to communicate over a suitable communications protocol. In the case of a microwave oven, the wireless transceiver 932 may be integrated into a power cord/cable 933 of the microwave oven 102 to avoid interference with the power microwave energy. That is, the wireless transceiver 932 (e.g., a WiFi chip) may be physically separate from the main body of the microwave oven 102 (e.g., embedded in the power cord/cable 933). In some embodiments, the wireless transceiver 932 can be implemented in the main body of the microwave oven 102 along with other internal components. In this scenario, a shielding structure may surround the wireless transceiver 932 to shield it from microwave energy.

A USB port 938 may further be provided as part of the wireless communication device 900 to facilitate a wired connection to a network, or a plug-in network device that communicates with other wireless networks. In addition to the USB port 938, or as an alternative thereto, other forms of wired connections may be employed, such as a broadband connection, Transmission Control Protocol/Internet Protocol (TCP/IP) protocol connection, etc.

When implemented as a primarily-voice-operated speech interface device 104, the wireless communication device 900 may omit input devices, such as navigation buttons, keypads, joysticks, keyboards, touch screens, and the like other than a microphone(s) 928. Further, there may be no output such as a display for text or graphical output in a speech interface device 104 implementation. The speaker(s) 930 may be the main output device. In one implementation, the wireless communication device 900 may include non-input control mechanisms, such as basic volume control button(s) for increasing/decreasing volume, as well as power and reset buttons. There may also be a simple light element (e.g., LED) to indicate a state such as, for example, when power is on.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A microwave oven comprising:
   a magnetron configured to operate in accordance with an on-and-off cycle where the magnetron emits microwave energy during an 'on' period of the on-and-off cycle and the magnetron does not emit microwave energy during an 'off' period of the on-and-off cycle;
   a WiFi radio chip configured to operate in an environment of the microwave oven;
   a microcontroller configured to determine that the magnetron is operating by determining that a voltage supplied to the magnetron transitions from a first voltage value greater than a threshold voltage to a second voltage value less than the threshold voltage; and
   logic configured to:
      determine a start time of the 'on' period, wherein the start time corresponds to a zero-crossing point between an input power associated with the magnetron and an electrical current associated with the magnetron;
      broadcast, via the WiFi radio chip, a Clear To Send (CTS) packet before the start time, the CTS packet including:
         a destination address of the microwave oven; and
         a Network Allocation Vector (NAV) that specifies a duration corresponding to the 'on' period; and
      cause the microwave oven to refrain from sending data via the WiFi radio chip during the 'on' period.

2. The microwave oven of claim 1, wherein the microwave oven is coupled to a remote system via a wireless access point (AP) located in the environment and the logic is further configured to:
   determine that a signal strength of the wireless AP has decreased from a first signal strength value to a second signal strength value;
   determine that a communication link between the microwave oven and the remote system has an associated first Transmission Control Protocol (TCP) Maximum Segment Size (MSS) value;
   determine a second TCP MSS value that is less than the first TCP MSS value; and
   send, via the WiFi radio chip, the second TCP MSS value to the remote system.

3. The microwave oven of claim 2, wherein the second signal strength value is less than a first threshold signal strength, and wherein the logic is further configured to:
   determine that the signal strength of the wireless AP is at a third signal strength value less than a second threshold signal strength, the second threshold signal strength less than the first threshold signal strength;
   determine a third TCP MSS value that is less than the second TCP MSS value; and
   send, via the WiFi radio chip, the third TCP MSS value to the remote system.

4. A method, comprising:
   determining, by a wireless communication device, that a magnetron is operating in an environment of the wireless communication device, the magnetron operating in accordance with an on-and-off cycle where the magnetron emits microwave energy during an 'on' period of the on-and-off cycle and the magnetron does not emit microwave energy during an 'off' period of the on-and-off cycle;
   determining, by the wireless communication device, a start time of the 'on' period, wherein the start time corresponds to a zero-crossing point between an input power associated with the magnetron and an electrical current associated with the magnetron;
   sending, by the wireless communication device, a Clear To Send (CTS) packet before the start time of the 'on' period, wherein the CTS packet specifies a duration that is based at least in part on the 'on' period;
sending, by the wireless communication device, data during the 'off' period; and
ceasing, by the wireless communication device, the sending of the data during the 'on' period.

5. The method of claim 4, wherein the wireless communication device is a microwave oven that includes a microcontroller, and wherein the determining that the magnetron is operating further comprises determining, by the microcontroller of the microwave oven, that a voltage supplied to the magnetron transitions from a first voltage value greater than a threshold voltage to a second voltage value less than the threshold voltage.

6. The method of claim 4, wherein the CTS packet includes:
a destination address of the wireless communication device; and
a Network Allocation Vector (NAV) that specifies the duration.

7. The method of claim 4, wherein the determining that the magnetron is operating further comprises:
determining, by a wireless transceiver of the wireless communication device, an energy waveform present in the environment;
determining, by the wireless communication device, that the energy waveform matches a pattern associated with microwave energy; and
determining that the magnetron is operating based at least in part on determining that the energy waveform matches the pattern associated with microwave energy.

8. The method of claim 4, wherein the wireless communication device is coupled to a remote system via an access point (AP) located in the environment, the method further comprising:
sending, by the wireless communication device, a first Transmission Control Protocol (TCP) Maximum Segment Size (MSS) value to the remote system;
determining, by the wireless communication device, that a signal strength of the AP has decreased from a first signal strength value to a second signal strength value;
determining, by the wireless communication device, a second TCP MSS value that is less than the first TCP MSS value; and
sending, by the wireless communication device, the second TCP MSS value to the remote system.

9. The method of claim 8, wherein the second signal strength value is less than a first threshold signal strength, the method further comprising:
determining, by the wireless communication device, that the signal strength of the AP is at a third signal strength value less than a second threshold signal strength, the second threshold signal strength less than the first threshold signal strength;
determining a third TCP MSS value that is less than the second TCP MSS value; and
sending, by the wireless communication device, the third TCP MSS value to the remote system.

10. The method of claim 4, further comprising:
capturing, by a microphone of the wireless communication device, an utterance corresponding to speech input;
determining that the 'on' period has lapsed; and
sending, during the 'off' period, audio data representing the speech input to a remote speech processing system.

11. The method of claim 4, wherein the wireless communication device is a microwave oven, the method further comprising:

receiving, during the 'off' period, command data from a second wireless communication device in the environment; and
performing, by the microwave oven, an action based at least in part on the command data.

12. A wireless communication device comprising:
a wireless transceiver configured to operate in an environment of the wireless communication device; and
logic configured to:
determine that a magnetron in the environment is operating, the magnetron operating in accordance with an on-and-off cycle where the magnetron emits microwave energy during an 'on' period of the on-and-off cycle and the magnetron does not emit microwave energy during an 'off' period of the on-and-off cycle;
determine a start time of the 'on' period, wherein the start time corresponds to a zero-crossing point between an input power associated with the magnetron and an electrical current associated with the magnetron;
send a Clear To Send (CTS) packet before the start time of the 'on' period, wherein the CTS packet specifies a duration that is based at least in part on the 'on' period;
send data during the 'off' period; and
cease sending the data during the 'on' period.

13. The wireless communication device of claim 12, wherein the wireless communication device is a microwave oven that further comprises a microcontroller, and wherein determining that the magnetron is operating further comprises determining, by the microcontroller of the microwave oven, that a voltage supplied to the magnetron transitions from a first voltage value greater than a threshold voltage to a second voltage value less than the threshold voltage.

14. The wireless communication device of claim 12, wherein the CTS packet includes:
a destination address of the wireless communication device; and
a Network Allocation Vector (NAV) that specifies the duration.

15. The wireless communication device of claim 12, wherein determining that the magnetron is operating further comprises:
determining, using the wireless transceiver, an energy waveform present in the environment;
determining that the energy waveform matches a pattern associated with microwave energy; and
determining that the magnetron is operating based at least in part on determining that the energy waveform matches the pattern associated with microwave energy.

16. The wireless communication device of claim 12, wherein the wireless communication device is coupled to a remote system via an access point (AP) located in the environment and the logic is further configured to:
send a first Transmission Control Protocol (TCP) Maximum Segment Size (MSS) value to the remote system;
determine that a signal strength of the AP has decreased from a first signal strength value to a second signal strength value;
determine a second TCP MSS value that is less than the first TCP MSS value; and
send, via the wireless transceiver, the second TCP MSS value to the remote system.

17. The wireless communication device of claim 12, further comprising a microphone, wherein the logic is further configured to:

capture, using the microphone, an utterance corresponding to speech input;
determine that the 'on' period has lapsed; and,
send, during the 'off' period, audio data representing the speech input to a remote speech processing system.

18. The wireless communication device of claim 12, wherein the wireless transceiver comprises at least one of a WiFi radio chip or a Bluetooth Low Energy (BLE) radio chip.

19. The wireless communication device of claim 12, wherein the wireless communication device is a microwave oven that includes a power cord, and wherein the wireless transceiver is embedded in the power cord.

20. The wireless communication device of claim 12, wherein the wireless communication device is a microwave oven, and wherein the logic is further configured to:
receive, during the 'off' period, command data from a second wireless communication device in the environment; and
perform an action based at least in part on the command data.

\* \* \* \* \*